United States Patent
Cooper

(10) Patent No.: US 11,580,125 B2
(45) Date of Patent: Feb. 14, 2023

(54) INFORMATION SYSTEM WITH TEMPORAL DATA

(71) Applicant: ADP, Inc., Roseland, NJ (US)

(72) Inventor: Thomas A. Cooper, Sutton, MA (US)

(73) Assignee: ADP, Inc., Roseland, NJ (US)

( * ) Notice: Subject to any disclaimer, the term of this patent is extended or adjusted under 35 U.S.C. 154(b) by 502 days.

(21) Appl. No.: 14/707,408

(22) Filed: May 8, 2015

(65) Prior Publication Data

US 2016/0328457 A1    Nov. 10, 2016

(51) Int. Cl.
  *G06F 16/24*    (2019.01)
  *G06F 16/2458*    (2019.01)

(52) U.S. Cl.
  CPC ................... *G06F 16/2477* (2019.01)

(58) Field of Classification Search
  CPC ........... G06F 17/30551; G06F 16/2477; G06F 16/9024; G06F 16/248; G06F 16/258; G06F 16/9027; G06F 16/3331; G06F 16/22; G06F 16/242; G06F 16/583; G06F 16/24575; G06F 16/90; G06F 16/24578; G06F 16/90335; G06F 16/24; G06F 16/282; G06F 16/903; G06F 16/25; G06F 16/13; G06F 16/27; G06F 16/288; G06F 16/38; G06F 16/2228; G06F 16/2246; G06F 16/285; G06F 16/9032; G06F 16/164; G06F 16/24552; G06F 16/284; G06F 16/184; G06F 16/21; G06F 16/24568; G06F 16/28; G06F 16/93; G06F 16/2358; G06F 16/2365; G06F 16/2322
  See application file for complete search history.

(56) References Cited

U.S. PATENT DOCUMENTS

| | | | |
|---|---|---|---|
| 5,162,986 A | 11/1992 | Graber et al. | |
| 5,745,681 A | 4/1998 | Levine et al. | |
| 5,862,325 A | 1/1999 | Reed et al. | |
| 6,088,717 A | 7/2000 | Reed et al. | |
| 6,202,129 B1 * | 3/2001 | Palanca | G06F 12/0875 711/133 |
| 6,332,163 B1 | 12/2001 | Bowman-Amuah | |
| 6,415,298 B1 | 7/2002 | Oesterer et al. | |
| 6,434,568 B1 | 8/2002 | Bowman-Amuah | |
| 6,539,396 B1 | 3/2003 | Bowman-Amuah | |
| 6,550,057 B1 | 4/2003 | Bowman-Amuah | |
| 6,813,587 B2 | 11/2004 | McIntyre et al. | |
| 6,986,102 B1 | 1/2006 | Baer et al. | |
| 7,146,524 B2 | 12/2006 | Patel et al. | |
| 8,028,329 B2 | 9/2011 | Whitcomb | |
| 8,230,443 B2 | 7/2012 | Resnick et al. | |

(Continued)

FOREIGN PATENT DOCUMENTS

WO    2006016350 A2    2/2006

*Primary Examiner* — Son T Hoang
(74) *Attorney, Agent, or Firm* — Yee & Associates, P.C.

(57) ABSTRACT

A method for accessing information. The information is received by a computer system from sources for distribution to client computer systems. A piece of the information received from the sources without temporal data is identified by the computer system. The temporal data for the piece of the information based on a policy is identified by the computer system. The temporal data is associated with the piece of the information by the computer system, enabling analyzing the information by a client computer system with increased accuracy.

51 Claims, 21 Drawing Sheets

(56) References Cited

U.S. PATENT DOCUMENTS

| | | |
|---|---|---|
| 8,275,836 B2 | 9/2012 | Beaven et al. |
| 8,351,600 B2 | 1/2013 | Resch |
| 8,417,715 B1 | 4/2013 | Bruckhaus et al. |
| 8,429,351 B1 | 4/2013 | Yu et al. |
| 8,468,137 B2 | 6/2013 | Baptist et al. |
| 8,473,756 B2 | 6/2013 | Orsini et al. |
| 8,909,806 B2 | 12/2014 | Bocharov et al. |
| 10,331,738 B2 * | 6/2019 | Ricker ............... H04N 21/8355 |
| 2003/0018510 A1 | 1/2003 | Sanches |
| 2003/0097383 A1 | 5/2003 | Smirnov et al. |
| 2007/0156767 A1 * | 7/2007 | Hoang ................... G06F 16/94 |
| 2008/0077628 A1 * | 3/2008 | Gonzalez ........... G06F 16/1767 |
| 2008/0104141 A1 * | 5/2008 | McMahon ............ G06F 40/197 |
| 2008/0168135 A1 | 7/2008 | Redlich et al. |
| 2010/0010968 A1 | 1/2010 | Redlich et al. |
| 2010/0023878 A1 * | 1/2010 | Douris ............... H04L 12/6418 |
| | | 715/757 |
| 2011/0145502 A1 * | 6/2011 | Joshi ..................... G06F 8/4442 |
| | | 711/125 |
| 2012/0054149 A1 * | 3/2012 | Khanna ............... G06F 17/3051 |
| | | 707/609 |
| 2012/0303670 A1 * | 11/2012 | Gillen ................... G06F 9/5072 |
| | | 707/797 |
| 2013/0018849 A1 * | 1/2013 | Johnston ........... G06F 17/30309 |
| | | 707/687 |
| 2014/0040199 A1 * | 2/2014 | Golab ................... G06F 16/211 |
| | | 707/634 |
| 2014/0089265 A1 * | 3/2014 | Talagala ........... G06F 17/30551 |
| | | 707/674 |
| 2015/0095586 A1 * | 4/2015 | Walker ................. G06F 12/122 |
| | | 711/136 |
| 2016/0078103 A1 * | 3/2016 | Novik ............... G06F 17/30551 |
| | | 707/725 |
| 2016/0154817 A1 * | 6/2016 | Mason, Jr. .......... G06F 16/1827 |
| | | 707/704 |

* cited by examiner

INFORMATION SYSTEM WITH TEMPORAL DATA

CROSS-REFERENCE TO RELATED APPLICATIONS

This application is related to the following patent applications: entitled "Subscription-Based Information System," Ser. No. 14/707,323; and entitled "Information System with Versioning," Ser. No. 14/707,451; each filed even date herewith, each assigned to the same assignee, and each incorporated herein by reference in its entirety.

BACKGROUND INFORMATION

1. Field

The present disclosure relates generally to an improved computer system, and in particular, to a method and apparatus for accessing information. Still more particularly, the present disclosure relates to a method and apparatus for accessing information that may be usable at different times in an information system.

2. Background

Information systems are used for many different purposes. Many types of information may be located in the information systems for use by an organization.

For example, an information system may have information in the form of payroll information. This payroll information is used to process payroll to generate paychecks for employees in an organization.

Additionally, an information system also may include personnel information used by a human resources department to maintain benefits and other records about employees. For example, a human resources department may manage health insurance, wellness plans, and other programs and organizations using benefits information in the information system. As another example, this type of information may be used to determine when to hire new employees, assign employees to projects, perform reviews for employees, and other suitable operations for the organization.

Further, the information may come from many sources. The sources may be different departments, organizations, or other sources of the information. These sources may also be in different locations. The information from the different sources may be in information systems for the different sources.

Making information available for use by customers may be more difficult than desired. In addition to the information being in different formats, the information also may be usable at different points in time. For example, a customer may perform product development for a new product. In developing the product, the customer may obtain a plan on using a particular component for use in the product. For example, specifications for the component may be for a change in the component that has not yet occurred. As a result, the customer cannot rely on using the specifications to create and test a prototype until the component change becomes effective. As a result, this specification is not yet usable for actual testing.

As another example, changes in the information occur at different times. These changes may include at least one of adding information, deleting information, or modifying information. These changes may affect the analysis of the information and the operations identified from the analysis of the information.

As a result, a customer may request information regularly to ensure that the customer has the most up-to-date information available for use. This process, however, may be more time-consuming and complex than desired. If the change in information requested by the customer is identified while an analysis has a ready begun, the analysis may be stopped and then restarted to take into account the change in the information.

If the customer is unaware of the change in information, then the analysis may not be as accurate as desired. As a result, the operations identified based on the analysis may not be the actual operations that should be performed.

Therefore, it would be desirable to have a method and apparatus that take into account at least some of the issues discussed above, as well as other possible issues. For example, it would be desirable to have a method and apparatus that overcome the technical problem of information being useable at different times, changing over time, or both being usable at different times and changing over time in an information system.

SUMMARY

An embodiment of the present disclosure provides a method for accessing information. The information is received by a computer system from sources for distribution to client computer systems. A piece of the information received from the sources without temporal data is identified by the computer system. The temporal data for the piece of the information based on a policy is identified by the computer system. The temporal data is associated with the piece of the information by the computer system, enabling analyzing the information by a client computer system with increased accuracy.

Another embodiment of the present disclosure provides a computer system comprising an information manager that receives information from sources for distribution to client computer systems. The information manager identifies a piece of the information received from the sources without temporal data. The information manager further identifies the temporal data for the piece of the information based on a policy. The information manager associates the temporal data with the piece of the information, enabling analyzing the information by a client computer system with increased accuracy.

Yet another embodiment of the present disclosure provides a computer program product for accessing information. The computer program product comprises a computer readable storage media, and first program code, second program code, third program code, and fourth program code stored on the computer readable storage media. The first program code receives the information from sources for distribution to client computer systems. The second program code identifies a piece of the information received from the sources without temporal data. The third program code identifies the temporal data for the piece of the information based on a policy. The fourth program code associates the temporal data with the piece of the information, enabling analyzing the information by a client computer system with increased accuracy.

Still another embodiment of the present disclosure provides a method for accessing information. A request for the information is received by a computer system. Temporal data is associated with the information and indicates when the information is useable. A time period for the request is identified by the computer system using the temporal data. A piece of the information corresponding to the request and corresponding to the time period identified is identified by the computer system. A response to the request is returned by the computer system. The response includes the piece of the information, enabling performing an operation using the information with increased accuracy.

Another embodiment of the present disclosure provides a computer system comprising an information manager that receives a request for information. Temporal data is associated with the information and indicates when the information is useable. The information manager also identifies a time period for the request using the temporal data. The information manager further identifies a piece of the information corresponding to the request and corresponding to the time period identified. The information manager returns a response to the request. The response includes the piece of the information, enabling performing an operation using the information with increased accuracy.

Another embodiment of the present disclosure provides a computer program product for accessing information. The computer program product comprises a computer readable storage media, and first program code, second program code, third program code, and fourth program code stored on the computer readable storage media. The first program code receives a request for the information. Temporal data is associated with the information and indicates when the information is useable. The second program code identifies a time period for the request using the temporal data. The third program code identifies a piece of the information corresponding to the request and corresponding to the time period identified. The fourth program code returns a response to the request. The response includes the piece of the information, enabling performing an operation using the information with increased accuracy.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that reducing the number of formats for a particular type of information may result in easier access and processing of information by a consumer. The illustrative embodiments also recognize and take into account that the reduction in the number of formats may occur through reducing the number of parties that control formats for a particular type of information that may be accessed by a consumer. A consumer is a person, organization, or entity that may access information using computers or other data processing devices.

Figure 1:
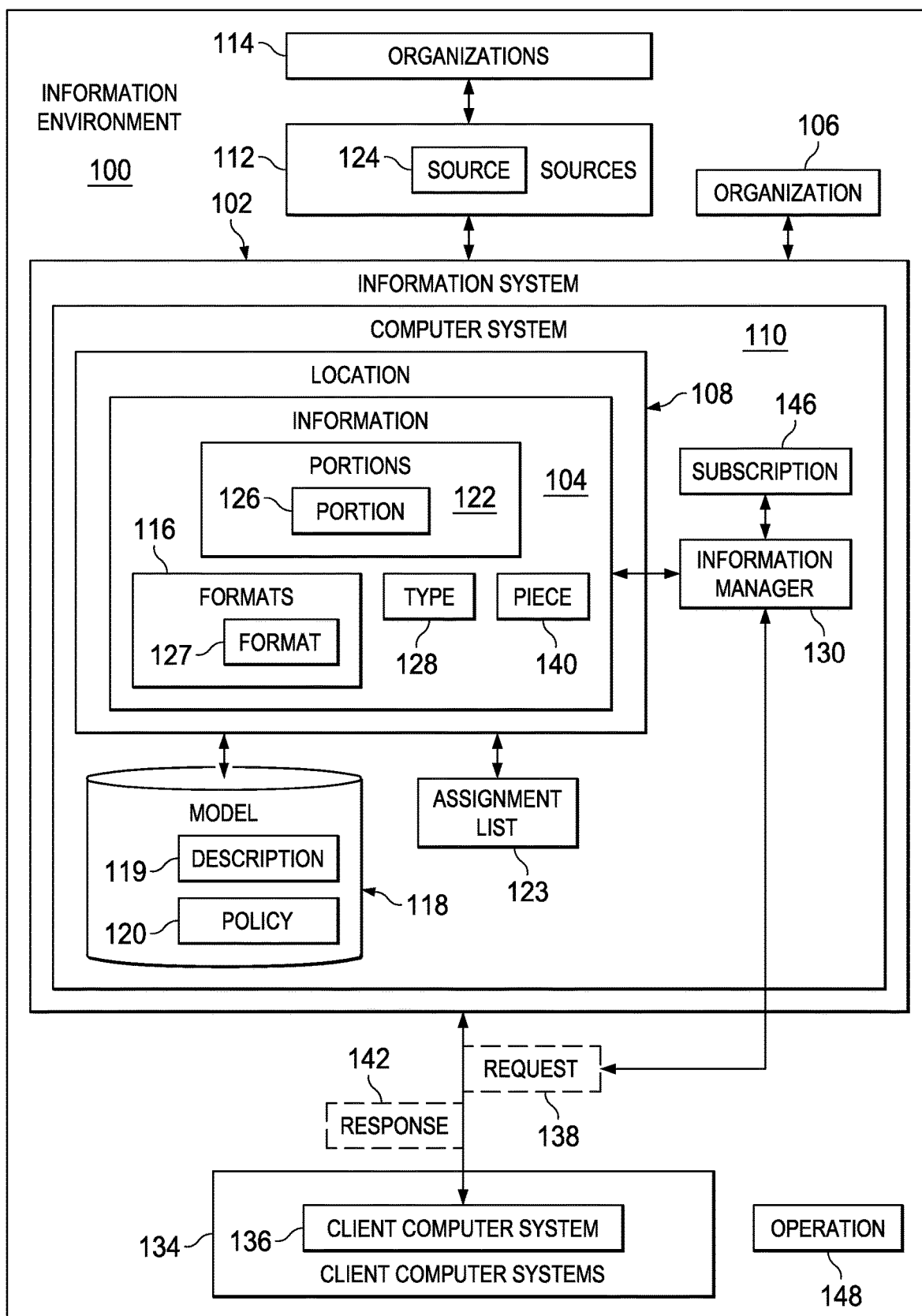
FIG. 1 is an illustration of a block diagram of an information environment in accordance with an illustrative embodiment.

With reference now to the figures, and in particular, with reference to FIG. 1, an illustration of a block diagram of an information environment is depicted in accordance with an illustrative embodiment. In this illustrative example, information environment 100 includes information system 102. Information system 102 manages information 104 about organization 106.

As depicted, information system 102 is used to manage information 104. This management of information 104 may include at least one of writing, modifying, deleting, distributing, partitioning, sharing, assigning ownership, accessing, or otherwise manipulating information 104.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 106 may take various forms. For example, organization 106 may be a company, a charity, an educational group, a social group, a team, a government entity, a group of businesses, or some other suitable organization.

As depicted, information 104 is stored in location 108 in computer system 110. Computer system 110 is a hardware system that includes one or more data processing systems. In this illustrative example, information 104 is stored in one or more data processing systems in location 108 in computer system 110.

When more than one data processing system is present in computer system 110, those data processing systems may be in communication with each other using a communications medium. The communications medium may be a network. The data processing systems may be in more than one location. The data processing systems may be selected from at least one of a computer, a server computer, or some other suitable data processing system for storing information 104 in location 108. Location 108 may be at least one of a computer, a storage system, a hard disk drive system, or some other part of computer system 110 that may store information 104. Location 108 may function as a hub for receiving and distributing information 104.

In this illustrative example, information 104 is received from a group of sources 112. "A group of," as used herein, when used with reference to items, means one or more items. For example, a group of sources 112 is one or more of sources 112.

As depicted, sources 112 are organizations 114 that send information 104 to location 108 in computer system 110. A portion of sources 112 may be part of organization 106 or may belong to organizations 114.

In this illustrative example, information 104 has formats 116. A format is the manner in which information 104 is organized. For example, a format for information 104 may include at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, a language, or other suitable formats that may be used to organize information 104.

In this illustrative example, model 118 is a description of entities and relationships between the entities. As depicted, description 119 in model 118 describes formats 116 for information 104 in location 108. Additionally, model 118 includes policy 120. Policy 120 is a group of rules and also may include information used to apply the group of rules.

In this illustrative example, policy 120 describes how sources 112 may be assigned to a group of portions 122 of information 104. For example, each of sources 112 is assigned to control a group of portions 122 of information 104 based on policy 120 in model 118.

As depicted, assignment list 123 identifies which ones of sources 112 are assigned to particular ones of portions 122. Assignment list 123 is generated when policy 120 is applied to identify the assignment of sources 112 to portions 122.

In the illustrative example, source 124 is assigned to control portion 126 in portions 122. In other words, source 124 controls information 104 in portion 126. As depicted, source 124 decides what information is present in portion 126, format 127 in formats 116 used for information 104 in portion 126, the size of portion 126, when information 104 in portion 126 is updated, and other suitable parameters with respect to portion 126.

In this illustrative example, information 104 present in portion 126 is based on type 128 of information 104. For example, all of information 104 in portion 126 may be information 104 about benefits. Benefits are ones of type 128 of information 104.

Type 128 of information 104 may take different forms. For example, type 128 of information 104 is selected from one of accounting, research, business planning, accounts receivable, accounts payable, sales, marketing, payroll, benefits, taxes, education, or other suitable classifications for information 104.

As depicted, information 104 in location 108 is managed by information manager 130. In this example, information manager 130 may be implemented in software, hardware, firmware, or a combination thereof. When software is used, the operations performed by information manager 130 may be implemented in program code configured to run on hardware, such as a processor unit. When firmware is used, the operations performed by information manager 130 may be implemented in program code and data and stored in persistent memory to run on a processor unit. When hardware is employed, the hardware may include circuits that operate to perform the operations in information manager 130.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, in managing information 104 in location 108, information manager 130 may perform various functions to manage information 104. For example, information manager 130 receives information 104 from sources 112. In particular, information manager 130 may receive information 104 from sources 112 for distribution to client computer systems 134. Information 104 may be received from sources 112 in formats 116 as described by model 118. In other words, information 104 may be placed into formats 116 by sources 112.

Information manager 130 places information 104 into location 108. Information 104 may be distributed to client computer systems 134.

Additionally, information manager 130 also facilitates the control of information 104 by sources 112. For example, information manager 130 may determine which ones of sources 112 may make changes to different ones of portions 122 of information 104. Information manager 130 may determine whether source 124 is allowed to change information 104 in portion 126 when source 124 sends a request to change information 104 in portion 126. This determination is made using assignment list 123, generated using policy 120.

Furthermore, information manager 130 also functions to distribute information 104 as part of managing information 104. In this illustrative example, information manager 130 may distribute information 104 to client computer systems 134. Client computer system 136 in client computer systems 134 is one or more data processing systems. The data processing system may be selected from at least one of a computer, a server computer, a workstation, a laptop computer, a tablet computer, a mobile phone, or some other suitable type of data processing system. Client computer systems 134 are consumers of information 104 in this depicted example.

For example, information manager 130 may receive request 138 from client computer system 136 in client computer systems 134. In this example, request 138 is for piece 140 of information 104.

Information manager 130 identifies piece 140 of information 104 that corresponds to request 138. Information manager 130 returns response 142 to request 138 for information 104 to client computer system 136. In this manner, access to information 104 in different formats may be simplified.

In this illustrative example, client computer systems 134 are aware of formats 116 for portions 122 of information 104. For example, client computer systems 134 may access model 118 and receive description 119 for formats 116. Client computer systems 134 may request description 119 in model 118 from information manager 130 in the illustrative example.

As depicted, client computer systems 134 may be made aware of changes to information 104. Client computer system 136 in client computer systems 134 may register with information manager 130 to obtain subscription 146.

For example, client computer system 136 may subscribe to one or more of portions 122 of information 104 controlled by sources 112. With subscription 146, information manager 130 notifies client computer system 136 subscribing to the group of portions 122 of information 104 of an occurrence of at least one of a change in format for the group of portions 122, an addition of information 104 to the group of portions 122, a deletion of information 104 from the group of portions 122, a modification of information 104 in the group of portions 122, a change of the group of sources 112 controlling the group of portions 122, or some other change to the group of portions 122. In this manner, information system 102 is a subscription-based information system.

Further, subscription 146 may be obtained when client computer system 136 first contacts information manager 130 to access information 104. In this example, subscription 146 results in information manager 130 sending description 119 of format 127 for portion 126 of information 104 to client computer system 136.

Thus, the technical problem of information 104 having different formats in information system 102 is solved through one or more technical solutions in the illustrative examples. In one illustrative example, a technical solution is present in which formats 116 for portions 122 are controlled by a limited number of sources 112. In the depicted example, each portion in portions 122 is controlled by a source in sources 112. Further, each portion has a type of information 104. As a result, when client computer system 136 requests a particular type of information 104 in portion 126, client computer system 136 knows what number of formats 116 to expect for information 104 when obtaining information 104 from portion 126.

In this manner, operation 148 may be performed. Operation 148 may be performed by client computer systems 134, organization 106, organizations 114, or some other suitable type of entity. Thus, portion 126 in portions 122 of information 104 is type 128 of information 104 that may be used to perform operation 148 for organization 106. As depicted, operation 148 may be, for example, hiring, benefits administration, research, forming a team, performing performance evaluations, manufacturing a product, or some other suitable type of operation.

The source controls format or formats used in the portion assigned to the source. As a result, a technical effect in which a reduced number of formats 116 are present for each of portions 122 occurs through reducing the number of sources 112 that control formats 116 for each of portions 122. By having source 124 control portion 126 of information 104, uniformity in formats 116 for portion 126 of information 104 may be achieved.

As a result, computer system 110 operates as a special purpose computer system in which information manager 130 in computer system 110 enables easier access to information 104 by client computer systems 134. The easier access occurs in one illustrative example through assigning control of portions 122 of information 104 to particular ones of sources 112. This assignment is made such that the number of formats 116 that are used in portions 122 is reduced. For example, portion 126 may use format 127 that is controlled by source 124. In this particular example, other ones of sources 112 do not supply portion 126 of information 104. As a result, conflicts with type 128 of information 104 in portion 126 from different formats may be avoided. In particular, information manager 130 transforms computer system 110 into a special purpose computer system as compared to currently available general computer systems that do not have information manager 130.

Computer system 110 in location 108 performs a transformation of information 104. For example, computer system 110 aggregates information 104 from sources 112 into location 108. As depicted, location 108 is between sources 112 and the consumers of information 104, client computer systems 134. In this example, client computer systems 134 may access information 104 more easily from location 108 knowing formats 116. As described above, description 119 of formats 116 may be obtained by client computer systems 134.

Figure 2:
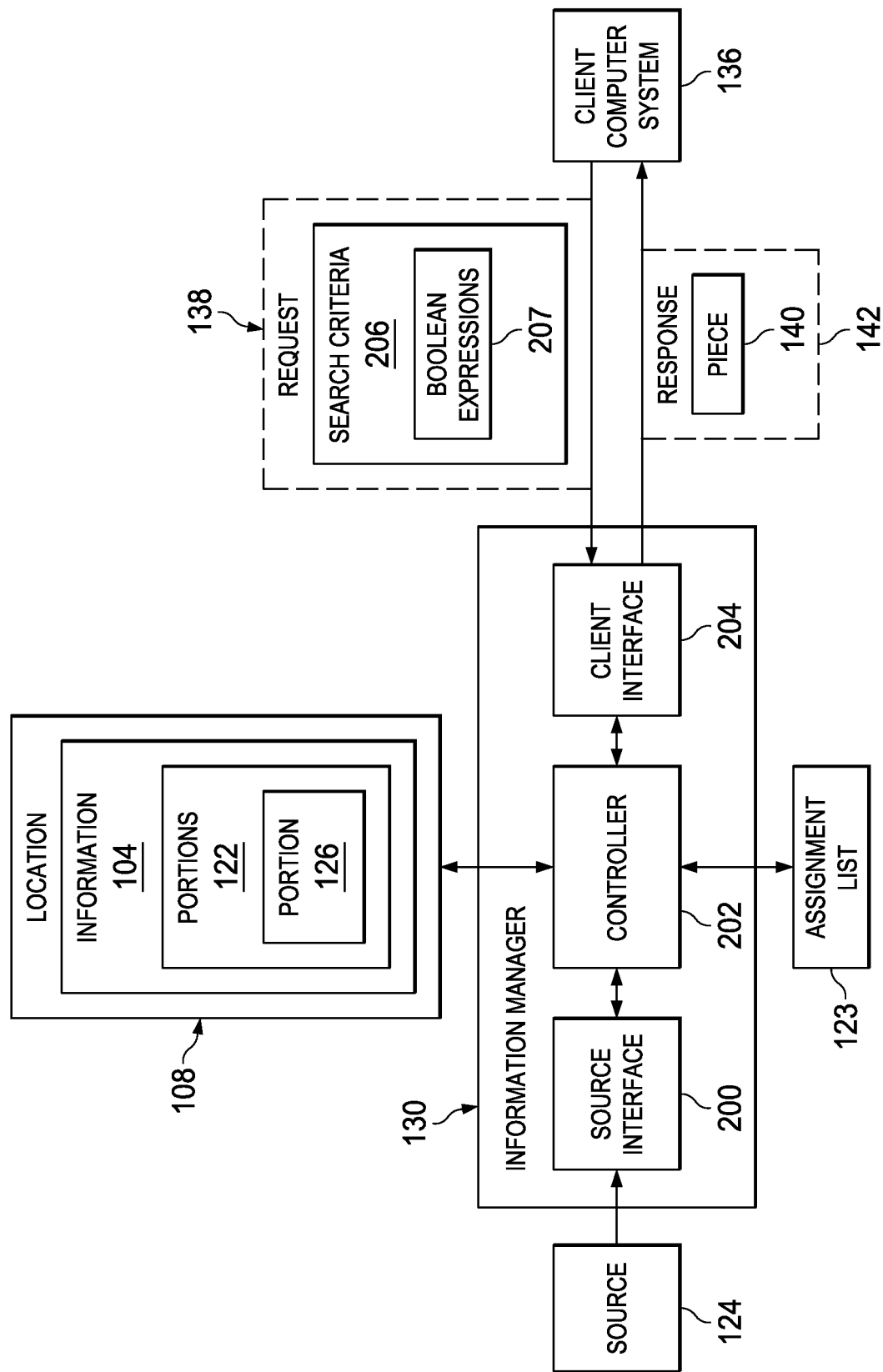
FIG. 2 is an illustration of a block diagram of data flow for accessing information in accordance with an illustrative embodiment.

With reference next to FIG. 2, an illustration of a block diagram of data flow for accessing information is depicted in accordance with an illustrative embodiment. In this figure, an example of data flow for a process for accessing piece 140 of information 104 through information manager 130 is shown. In the illustrative examples, the same reference numeral may be used in more than one figure. This reuse of a reference numeral in different figures represents the same element in the different figures.

In this illustrative example, information manager 130 has a number of different components. As depicted, information manager 130 includes source interface 200, controller 202, and client interface 204. In this illustrative example, each of source interface 200 and client interface 204 is at least one of web services, representational state transfer services, durable queues, or some other suitable type of service interface.

As depicted, controller 202 receives request 138 through client interface 204. In this illustrative example, request 138 includes search criteria 206. Search criteria 206 indicate a group of portions 122 of information 104. As depicted, search criteria 206 may be in the form of a query. For example, the query may be defined using a query by example (QBE) standard.

Search criteria 206 includes a group of boolean expressions 207. The group of boolean expressions 207 are tests for values in the group of portions 122 of information 104. The group of boolean expressions 207 includes at least one of a wild card or text. A wild card indicates matching text is variable for the portion indicated by the wild card. Wild cards in search criteria 206 are selected from at least one of "*", "?", or other suitable types of wild cards.

For example, search criteria 206 may include a boolean expression indicating the name value pair "employee": "*Smith." In this example, search criteria 206 is a request for portions 122 of information 104 indicated by a name value pair with the name "employee" and a value that matches any text that ends with "Smith." For example, when a value for a named value pair with the name "employee" in a portion of the information includes the value "Tom Smith," the portion indicates a match for search criteria 206.

Controller 202 identifies piece 140 of information 104 in location 108 based on search criteria 206. In this illustrative example, location 108 in computer system 110 may organize information 104 in a number of different ways. For example, at least one of a graph database, a relational database, a file system, or some other suitable type mechanism for organizing information 104 may be used.

Controller 202 then generates response 142. In this illustrative example, controller 202 includes piece 140 in response 142. Controller 202 then sends response 142 to client computer system 136 through client interface 204.

Figure 3:
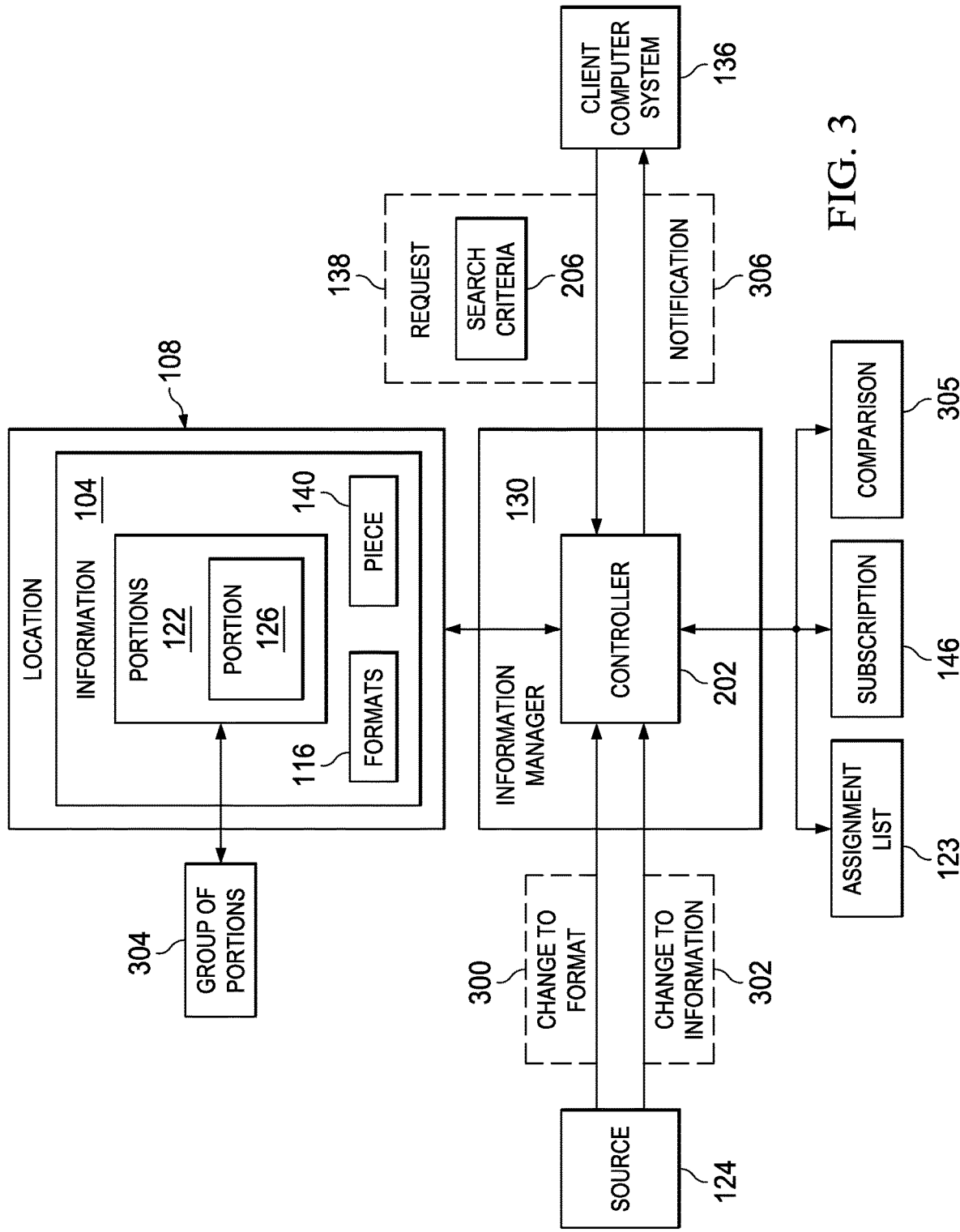
FIG. 3 is an illustration of a block diagram of data flow for processing subscriptions to portions of information in accordance with an illustrative embodiment.

Turning to FIG. 3, an illustration of a block diagram of data flow for processing subscriptions to portions of information is depicted in accordance with an illustrative embodiment. In this figure, an example of data flow for a process for processing subscription 146 through information manager 130 is shown.

In processing subscription 146, controller 202 receives request 138. Request 138 includes search criteria 206. In this illustrative example, controller 202 stores search criteria 206 in subscription 146. Controller 202 stores search criteria 206 in subscription 146 when controller 202 receives request 138.

In this illustrative example, controller 202 receives at least one of change to format 300 for group of portions 304 in portions 122 or change to information 302 for group of portions 304. Change to information 302 is at least one of information for group of portions 304, an addition of additional information for group of portions 304, a modification of information 104 in group of portions 304, or a deletion of information 104 from group of portions 304. Change to format 300 is at least one of an additional format in formats 116 for group of portions 304, modifications to a format in formats 116 for group of portions 304, or a removal of a format in formats 116 for group of portions 304.

Controller 202 compares source 124 to assignment list 123 for group of portions 304. Controller 202 determines whether source 124 is allowed to change group of portions 304 based on the comparison. Controller 202 stores at least one of change to format 300 for group of portions 304 in portions 122 or change to information 302 for group of portions 304 in location 108 when source 124 is allowed to change group of portions 304.

Controller 202 generates comparison 305 between search criteria 206 and the change allowed to group of portions 304. In this illustrative example, comparison 305 is an indication of a match between search criteria 206 and the change allowed to group of portions 304. For example, when search criteria 206 includes a boolean expression indicating the name value pair "accounting data": "*", comparison 305 indicates portions of the change located in accounting data in information 104.

Controller 202 identifies piece 140 of information 104 based on comparison 305. For example, piece 140 may include a portion of the change allowed to group of portions 304.

Controller 202 generates notification 306 when piece 140 of information 104 is identified in comparison 305. In this illustrative example, controller 202 includes at least one of a copy of piece 140, a pointer to piece 140, or other suitable information in notification 306. Controller 202 also includes an indication of at least one of change to format 300 or change to information 302 in notification 306. Controller 202 then sends notification 306 to client computer system 136.

Figure 4:
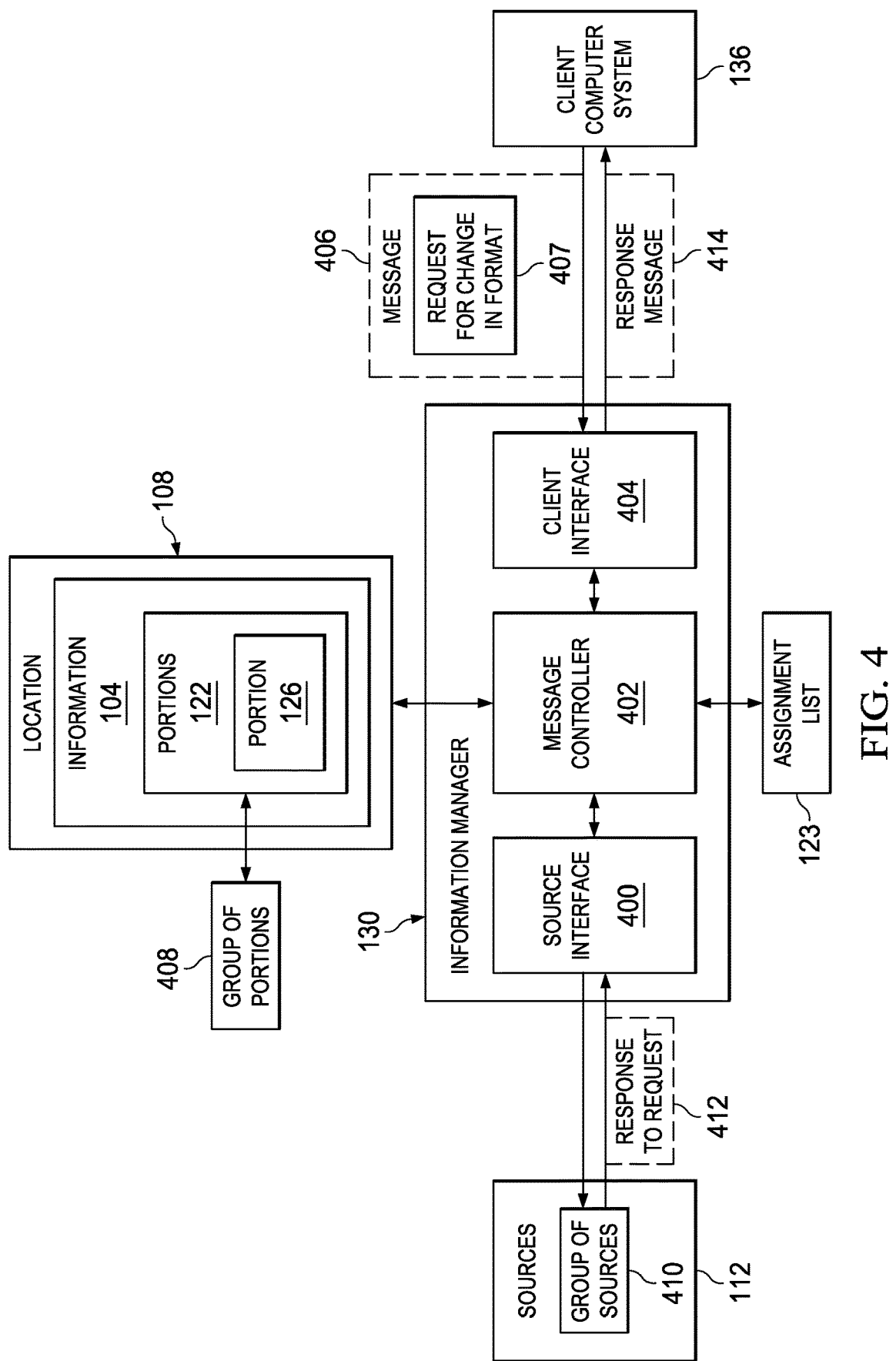
FIG. 4 is an illustration of a block diagram of data flow for managing messages between client computer systems and sources of information in accordance with an illustrative embodiment.

Turning now to FIG. 4, an illustration of a block diagram of data flow for managing messages between client computer systems and sources of information is depicted in accordance with an illustrative embodiment. In this figure, an example of data flow for a process for managing messages through information manager 130 is shown.

In this illustrative example, information manager 130 has a number of different components. As depicted, information manager 130 includes source interface 400, message controller 402, and client interface 404.

As depicted, client interface 404 is at least one of an email service, an instant messaging service, or other suitable type of messaging service. Source interface 400 is at least one of a web service, a representational state transfer service, a durable queue, an email service, an instant messaging service, or other suitable type of service interface.

Message controller 402 receives message 406 from client computer system 136. As depicted, message 406 includes request for change in format 407 for group of portions 408.

Message controller 402 identifies group of sources 410 that own portion 126 based on assignment list 123. Message controller 402 sends group of sources 410 request for change in format 407 through source interface 400.

Message controller 402 receives response to request 412 from group of sources 410. Message controller 402 generates response message 414. Message controller 402 includes an indication of response to request 412 in response message 414. Message controller 402 then sends response message 414 to client computer system 136 through client interface 404.

For example, request for change in format 407 may be a request to change a field in portion 126 from using United States dollar format to Euro format. Request for change in format 407 may also include a request to change the order of fields in portion 126. Request for change in format 407 may further include a request to add additional fields to portion 126.

When these changes are for performing operation 148 in FIG. 1, these changes may save organization 106 time because portion 126 would be closer to what is needed to perform operation 148. In this illustrative example, an employee of organization 106 does not need to know who to talk to in sources 112 to make request for change in format 407 for portion 126.

Figure 5:
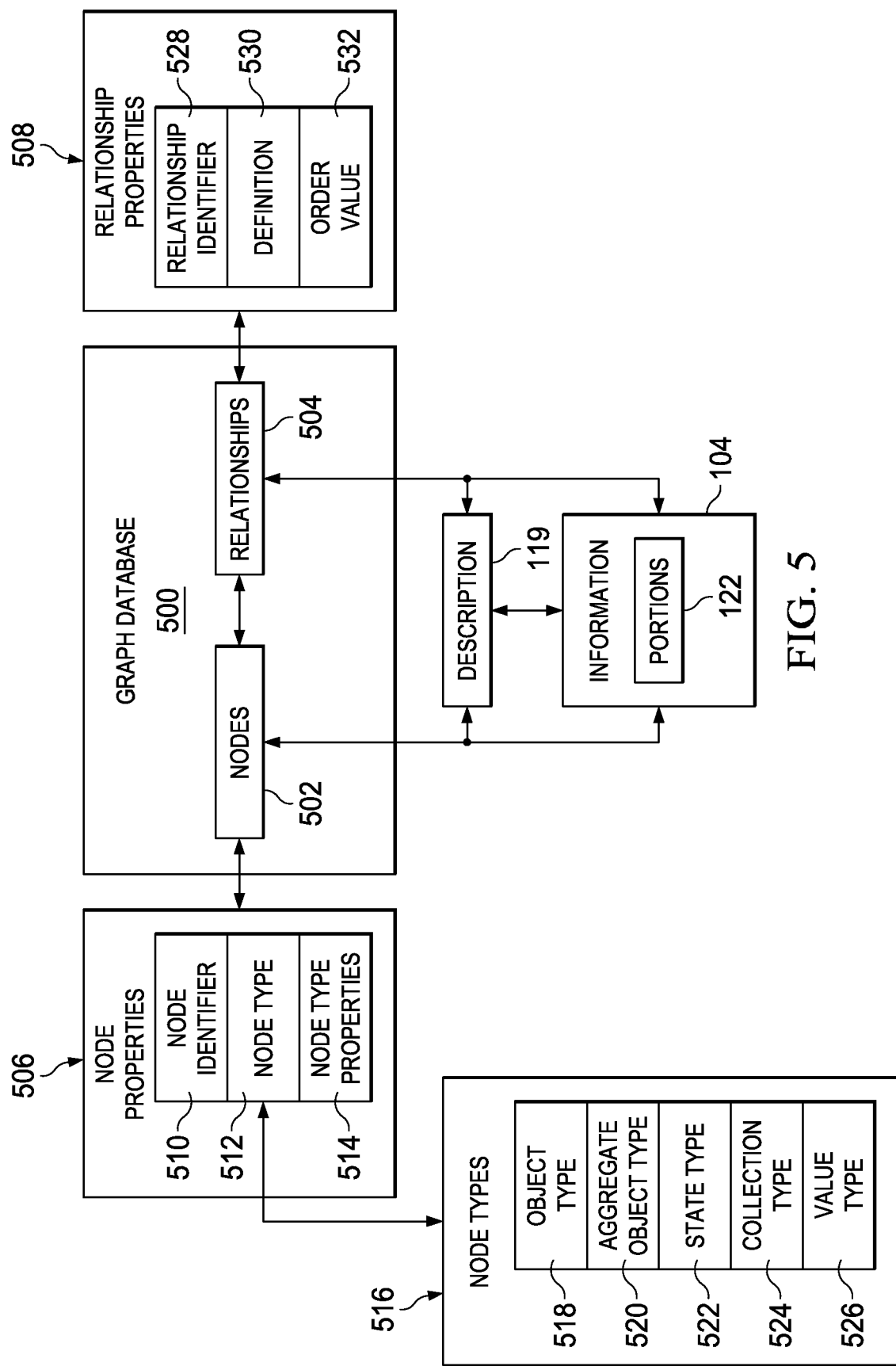
FIG. 5 is an illustration of a block diagram of a graph database in accordance with an illustrative embodiment.

With reference to FIG. 5, an illustration of a block diagram of a graph database is depicted in accordance with an illustrative embodiment. In this illustration, graph database 500 is an example of a data structure that may be used in location 108 in FIGS. 1-4. Graph database 500 may store information 104.

As depicted, graph database 500 includes nodes 502 and relationships 504. In this illustrative example, nodes 502 indicate description 119 of formats 116 for portions 122 of information 104. Nodes 502 also indicate values for portions 122 of information 104. Nodes 502 may represent at least one of accounting, research, business planning, accounts receivable, accounts payable, sales, marketing, payroll, benefits, taxes, education, or other suitable classifications for information 104. As depicted, relationships 504 indicate the relationship between nodes 502.

In this illustrative example, nodes 502 have node properties 506. Additionally, relationships 504 have relationship properties 508.

As depicted, node properties 506 are the properties of nodes 502. These properties of nodes 502 identify description 119 of formats 116 for portions 122 of information 104. These properties also identify values for portions 122 of information. In this illustrative example, node properties 506 include node identifier 510, node type 512, and node type properties 514.

Node identifier 510 points to the node in which node identifier 510 is located. For example, node identifier 510 may be alpha numeric text that identifies the node in graph database 500.

Node type 512 indicates the type of the node in which node type 512 is located. Node type 512 also indicates the type of properties in node type properties 514.

In this illustrative example, node type 512 is selected from at least one of node types 516 or some other suitable type for representing portions 122 of information 104 as nodes 502 in graph database 500. As depicted, node types 516 include object type 518, aggregate object type 520, state type 522, collection type 524, and value type 526.

State type 522 is the node type of a node in nodes 502 for state. State is a set of named values for a portion of information 104. A set of items is one or more items. For example, a set of named values is one or more named values.

Object type 518 is the node type of a node in nodes 502 for an object. An object is a data structure that contains data. The data is a portion of the information. For example, when the portion of information includes a name formed by a first name and a last name, the name is an object with the first name and the last name.

As another illustrative example, when the portion of information 104 includes a customer list with names and contact information, the customer list is an object that includes a list of names and contact information. In this example, the contact information may also be an object.

Aggregate object type 520 is an example of node types 516 used for an aggregate object. An aggregate object is an object with a key. The key in an aggregate object is a pointer to the aggregate object for a portion of information. The key is used to access the portion through client interface 204.

Collection type 524 is an example of node types 516. In this illustrative example, collection type 524 is used for a collection. A collection is a sequence of portions of information. The sequence includes at least one of objects, collections, or values.

Value type 526 is an example of node types 516 for a value. This value is a value in a portion of information.

Node type properties 514 indicate at least one of the format or the values of portions 122 of information 104. Node type properties 514 include at least one of attributes, values, references, or other suitable types of properties. For example, a node type property for a node may be at least one of an attribute of the node, a value for the node, or a reference pointing to the node.

In the illustrated example, relationship properties 508 are the properties of relationships 504. These properties are the properties of the relationship between two nodes. As depicted, relationship properties 508 include relationship identifier 528, definition 530, and order value 532.

Relationship identifier 528 points to the relationship in which relationship identifier 528 is located. For example, relationship identifier 528 may be alpha numeric text that identifies the relationship in graph database 500.

As depicted, definition 530 defines the relationship between two nodes. Definition 530 includes pointers to the two nodes. Definition 530 indicates the two nodes are related to each other.

For example, when the first of the two nodes is an object, definition 530 defines a relationship between the object and at least one of another object, a state of the object, a collection of the object, or a value of the object. As another example, when the first node of the two nodes is a collection, definition 530 defines a relationship between the collection and at least one of another collection in the collection, an object in the collection, a group of states in the collection, or a value in the collection.

In this illustrative example, order value 532 is a value specifying relative order of a relationship in a sequence of relationships. For example, the value may be at least one of a number, an alphanumeric sequence of characters, or some other suitable value that indicates order in a sequence of relationships.

Figure 6:
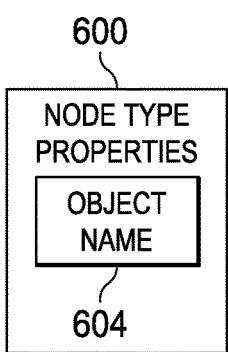
FIG. 6 is an illustration of a block diagram of node type properties for an object in accordance with an illustrative embodiment.

FIGS. 6-10 are illustrative examples of node type properties 514 in FIG. 5. With reference first to FIG. 6, an illustration of a block diagram of node type properties for an object is depicted in accordance with an illustrative embodiment. In this illustrative example, node type properties 600 are an example of node type properties 514 in node properties 506. In this illustration, node type properties 600 are for a node in nodes 502 that represents an object.

As depicted, node type properties 600 includes object name 604. Object name 604 is the name of a portion of information in portions 122 of information 104 in FIGS. 1-5. For example, when description 119 of formats for portions 122 of information 104 is in JavaScript object notation (JSON), the portion is an object that is defined using JavaScript object notation. In this example, object name 604 is the name of the object defined using JavaScript object notation. Description 119 of formats for portions 122 of information 104 may be in a language selected from at least one of extensible markup language (XML), standard generalized markup language (SGML), or some other suitable type of standard for defining formats of information.

Figure 7:
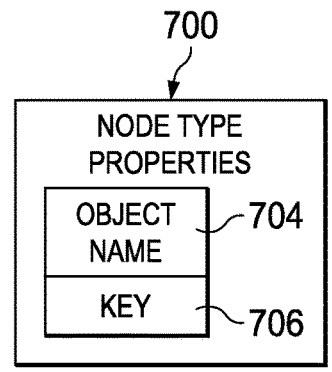
FIG. 7 is an illustration of a block diagram of node type properties for an aggregate object in accordance with an illustrative embodiment.

With reference next to FIG. 7, an illustration of a block diagram of node type properties for an aggregate object is depicted in accordance with an illustrative embodiment. In this illustrative example, node type properties 700 are an example of node type properties 514 in node properties 506 in FIG. 5. In this illustration, node type properties 700 are for a node in nodes 502 that represents an aggregate object.

As depicted, node type properties 700 include object name 704 and key 706. Object name 704 is the name of a portion of information in portions 122 of information 104 in FIGS. 1-5. Key 706 is a name of the portion that may be used to access the portion through client interface 204. For example, key 706 may be a universal resource locator that points to the portion.

Figure 8:
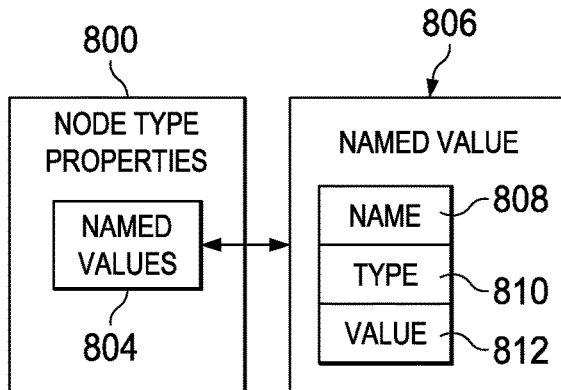
FIG. 8 is an illustration of a block diagram of node type properties for a state in accordance with an illustrative embodiment.

With reference now to FIG. 8, an illustration of a block diagram of node type properties for a state is depicted in accordance with an illustrative embodiment. In this illustrative example, node type properties 800 are an example of node type properties 514 in node properties 506 in FIG. 5. In this illustration, node type properties 800 are for a node in nodes 502 that represents a state.

As depicted, node type properties 800 include a set of named values 804. Named value 806 is an example of a named value in the set of named values 804. Named value 806 includes name 808, type 810, and value 812.

Name 808 is the name of value 812 for a portion of information in portions 122 of information 104 in FIGS. 1-5. Type 810 is the type of value 812. In this illustrated example, type 810 is selected from at least one of string, number, integer, double, Boolean, or some other suitable type of value for the portion.

As depicted, value 812 is the value for the portion of information in portions 122 of information 104 named by name 808. For example, named values 804 may be name value pairs for a portion of information in portions 122 of information 104.

Figure 9:
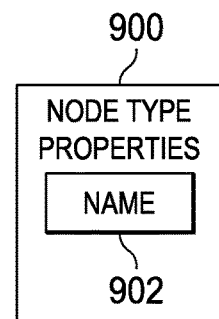
FIG. 9 is an illustration of a block diagram of node type properties for a collection in accordance with an illustrative embodiment.

Turning next to FIG. 9, an illustration of a block diagram of node type properties for a collection is depicted in accordance with an illustrative embodiment. In this illustrative example, node type properties 900 are an example of node type properties 514 in FIG. 5. In this illustration, node type properties 900 are for a collection.

As depicted, node type properties 900 include name 902. Name 902 is the name for an array of at least one of objects, collections, or values for a portion of information in portions 122 of information 104 in FIGS. 1-5.

For example, when description 119 of formats 116 for portions 122 of information 104 is in JavaScript object notation (JSON), this portion is an array that is defined using JavaScript object notation. In this example, name 902 is the name of the array defined using JavaScript object notation.

Figure 10:
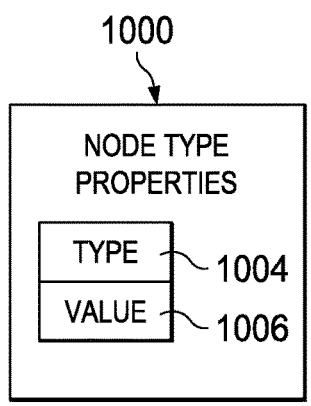
FIG. 10 is an illustration of a block diagram of node type properties for a value in accordance with an illustrative embodiment.

Turning now to FIG. 10, an illustration of a block diagram of node type properties for a value is depicted in accordance with an illustrative embodiment. In this illustrative example, node type properties 1000 are an example of node type properties 514 in FIG. 5. In this illustration, node type properties 1000 are for a value.

As depicted, node type properties 1000 include type 1004 and value 1006. Type 1004 is the type of value 1006 for a portion of information in portions 122 of information 104 in FIGS. 1-5. In this illustrated example, type 1004 is selected from at least one of string, number, integer, double, Boolean, or some other suitable type of value for the portion of information. As depicted, value 1006 is the value for the portion of information.

The illustration of information environment 100 and the different components in FIGS. 1-10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more of sources 112 may be assigned to portion 126 in addition to source 124. For example, two organizations in organizations 114 may have sources 112 that send information 104 to portion 126. Both of these organizations may control format 127 for portion 126. Format 127 is used for all of information 104 in portion 126 in this illustrative example.

In another illustrative example, information 104 may be located in one or more locations in addition to in place of location 108. In other words, information 104 may be stored in a distributed manner.

As another example, at least one of source interface 200 or client interface 204 may be located in controller 202. As still another example, source interface 200 may include a first portion located in source 124 and a second portion located in controller 202.

As a further example, node types 516 may include at least one of additional node types, fewer node types, or different node types. For example, aggregate object type 520 may be removed from node types 516. In this example, key 706 may be at least one of added to node type properties 600 or added as a state in nodes 502.

Figure 11:
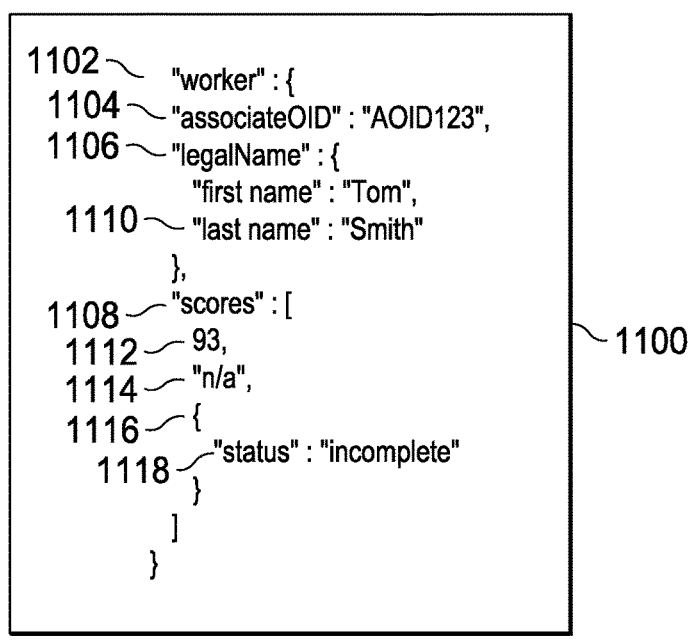
FIG. 11 is an illustration of a portion of information in accordance with an illustrative embodiment.

With reference to FIG. 11, an illustration of a portion of information is depicted in accordance with an illustrative embodiment. In this illustration, portion 1100 is an example of portion 126 in information 104 in FIG. 1. As depicted, portion 1100 is shown in text using JavaScript object notation.

In this illustrative example, portion 1100 is at least one of received from a source in sources 112 or sent to a client computer system in client computer systems 134 in FIG. 1. In this illustrative example, portion 1100 includes object 1102. Object 1102 has the name "worker." Object 1102 includes named value 1104, object 1106, and collection 1108. Named value 1104 indicates "associateOID" has the value "AOID123."

As depicted, object 1106 has the name "legalName." Object 1106 includes named values 1110. Named values 1110 indicate "first name" has the value "Tom" and "last name" has the value "Smith."

Collection 1108 has the name "scores" in this illustrative example. Collection 1108 includes value 1112, value 1114, and object 1116. As depicted, value 1112 is the first item in collection 1108, value 1114 is the second item in collection 1108, and object 1116 is the third item in collection 1108. Value 1112 indicates the first item in collection 1108 has the value "93." Value 1114 indicates the second item in collection 1108 has the value "n/a." Object 1116 includes named value 1118. Named value 1118 indicates "status" has the value "incomplete." Thus, object 1116 indicates the third item in collection 1108 has named value 1118 that indicates "status" has the value "incomplete."

Figure 12:
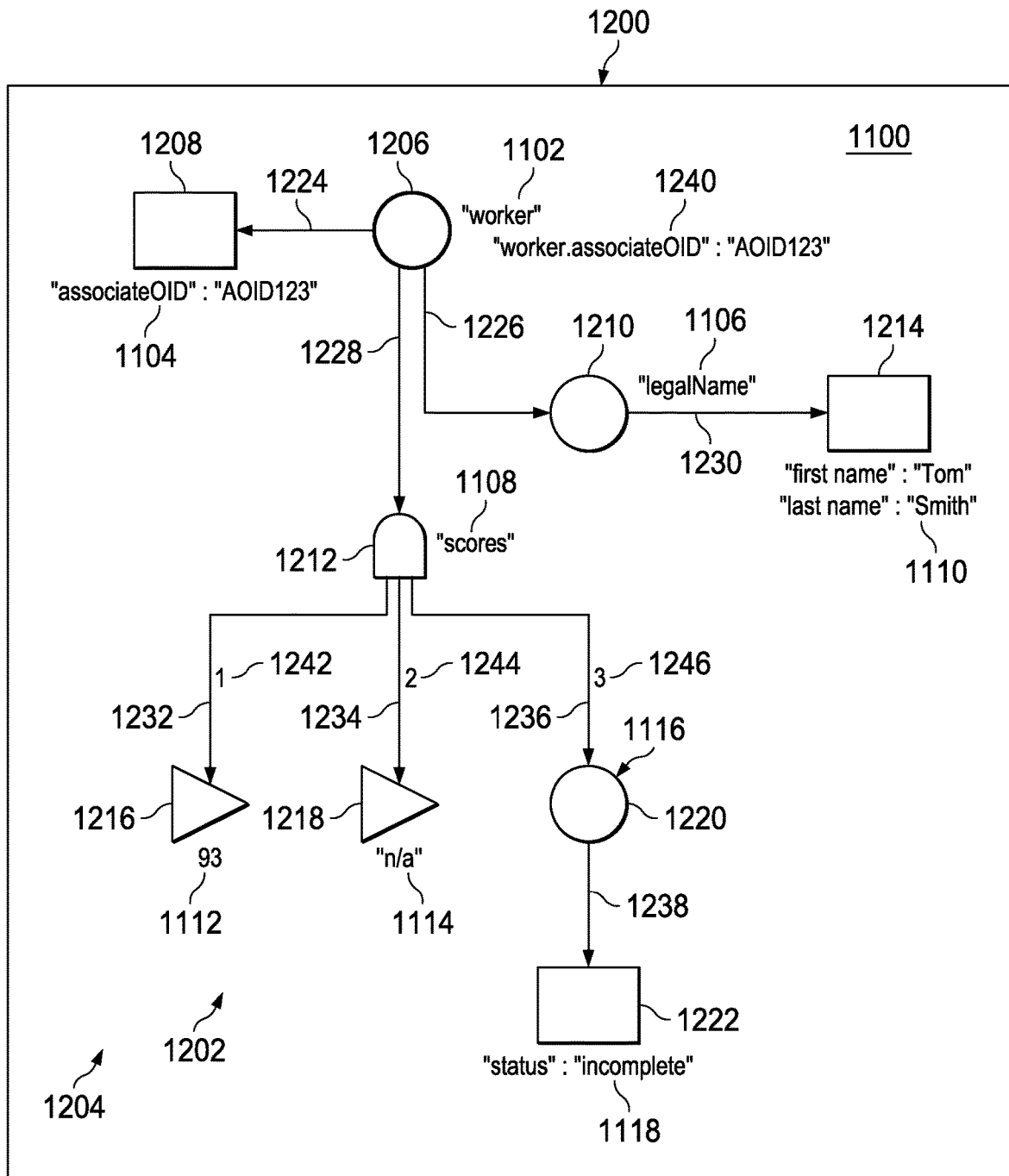
FIG. 12 is an illustration of a graph of information in accordance with an illustrative embodiment.

With reference next to FIG. 12, an illustration of a graph of information is depicted in accordance with an illustrative embodiment. In this illustration, graph 1200 shows nodes 1202 and relationships 1204.

As depicted, nodes 1202 are an example of nodes 502 in graph database 500 and relationships 1204 are an example of relationships 504 in graph database 500 in FIG. 5. In particular, graph 1200 shows where information manager 130 stores portion 1100 of information 104 in graph database 500.

As depicted, nodes 1202 include aggregate object 1206, state 1208, object 1210, collection 1212, state 1214, value 1216, value 1218, object 1220, and state 1222. Aggregate object 1206 is the node in graph database 500 where object 1102 is stored. State 1208 is where named value 1104 is stored. Object 1210 is where object 1106 is stored. Collection 1212 is where collection 1108 is stored. State 1214 is where named values 1110 are stored. Value 1216 is where value 1112 is stored. Value 1218 is where value 1114 is stored. Object 1220 is where object 1116 is stored. State 1222 is where named value 1118 is stored.

In this illustrative example, relationships 1204 include relationship 1224 between aggregate object 1206 and state 1208; relationship 1226 between aggregate object 1206 and object 1210; relationship 1228 between aggregate object 1206 and collection 1212; relationship 1230 between object 1210 and state 1214; relationship 1232 between collection 1212 and value 1216; relationship 1234 between collection 1212 and value 1218; relationship 1236 between collection 1212 and object 1220; and relationship 1238 between object 1220 and state 1222.

Aggregate object 1206 includes key 1240. Key 1240 is an example of key 706 in node type properties 700 in FIG. 7. In this illustrated example, key 1240 is a named value. Key 1240 indicates "worker.associateOID" has the value "AOID123." Aggregate object 1206 may be accessed through client interface 204 with key 1240.

As depicted, relationship 1232 has value 1242, relationship 1234 has value 1244, and relationship 1236 has value 1246. Value 1242, value 1244, and value 1246 are examples of order value 532 in relationship properties 508 in FIG. 5. In this illustrative example, value 1242 in relationship 1232 indicates value 1216 is the first item in collection 1212; value 1244 in relationship 1234 indicates value 1218 is the second item in collection 1212; and value 1246 in relationship 1236 indicates object 1220 is the third item in collection 1212.

The illustrative embodiments also recognize and take into account that changes in information may make it more difficult than desired for a customer to use the information. For example, the illustrative embodiments recognize and take into account that knowing when information is usable is helpful in knowing whether to use the information in identifying operations to be performed. An operation identified using the information may be different if it is known that a piece of the information is not yet usable for identifying the operation.

For example, information about a zoning change in a location that has not yet occurred may be relevant in identifying a real estate development operation. Knowing when the information is useful may be relevant in identifying a real estate development operation involving the location.

In another example, the illustrative embodiments recognize and take into account that knowing when information changes is often useful in analyzing information. For example, the illustrative embodiments recognize and take into account that changes in information may result in restarting an analysis if the analysis is ongoing when the change occurs. Additionally, another analysis may need to be performed if the information changes after the analysis is completed.

For example, forming an analysis in payroll for a one month period may not be as accurate as desired if some information about payroll is added after the information has been treated for analysis. Knowing when changes to the payroll information occur is useful in knowing when to request information about payroll.

Thus, the illustrative embodiments recognize and take into account that it would be helpful to provide data about the usability, changes, or both usability and changes to information in an information system. In one illustrative example, a method for accessing information receives a request for the information, wherein temporal data is associated with the information and indicates when the different portions of information are useable. A time period is identified for the request using the temporal data. A piece of the information corresponding to the request and corresponding to the time period is identified. A response to the request for the information is returned. The response includes the piece of the information, enabling performing an operation using the information with increased accuracy.

Figure 13:
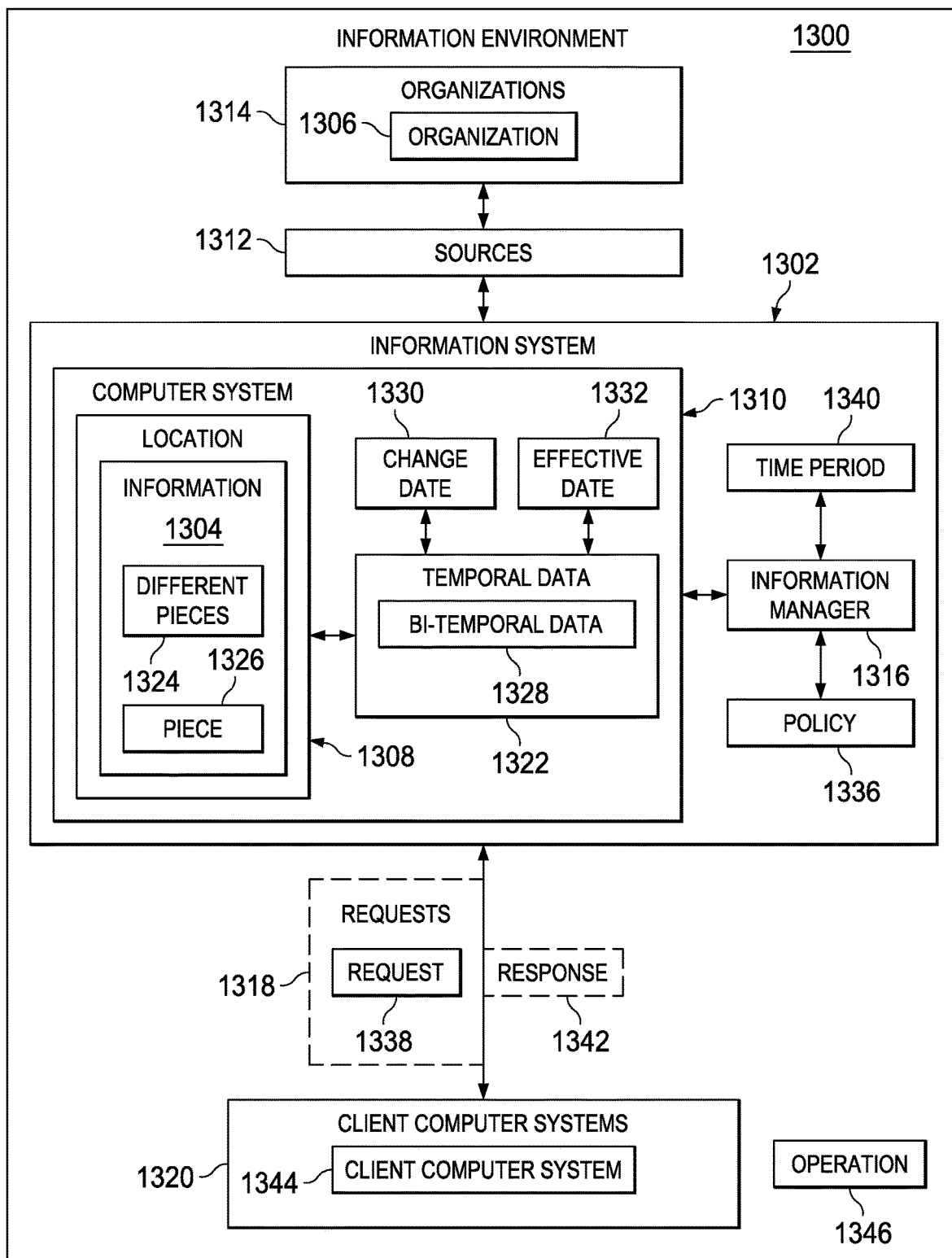
FIG. 13 is an illustration of a block diagram of an information environment in accordance with an illustrative embodiment.

With reference now to FIG. 13, an illustration of a block diagram of an information environment is depicted in accordance with an illustrative embodiment. In this illustrative example, information environment 1300 includes information system 1302. Information system 1302 manages information 1304 about organization 1306.

As depicted, information 1304 is stored in location 1308 in computer system 1310. Computer system 1310 is a hardware system that includes one or more data processing systems. In this illustrative example, information 1304 is stored in one or more data processing systems in location 1308 in computer system 1310. Information 1304 may be stored in one or more databases, or other storage architectures in the one or more data processing systems in location 1308.

In this illustrative example, information system 1302 receives information 1304 from a group of sources 1312. As depicted, sources 1312 are organizations 1314 that send information 1304 to location 1308 in computer system 110. A portion of sources 1312 may be controlled by organization 1306 or may be controlled by organizations 1314.

In this illustrative example, information manager 1316 manages information 1304 in location 1308. For example, information manager 1316 handles receiving and storing information 1304 received from sources 1312. Further, information manager 1316 also handles processing requests 1318 for information 1304 received from client computer systems 1320.

In this illustrative example, the usability of information 1304 is enhanced in information system 1302. As depicted, temporal data 1322 is associated with information 1304 in location 1308 in computer system 1310.

As depicted, temporal data 1322 provides information about information 1304. For example, temporal data 1322 indicates when different pieces 1324 of information 1304 are usable. Further, temporal data 1322 may be associated with all or some of information 1304.

In this illustrative example, information 1304 may be the same as information 104 in FIG. 1. However, different pieces 1324 of information 1304 may be different from portions 122 of information 104 in FIG. 1.

For example, portions 122 of information 104 are parts of information 104 that are controlled by different ones of sources 112. Different pieces 1324 of information 1304 may be in a single portion or multiple portions in portions 122 as depicted in FIG. 1. For example, multiple ones of different pieces 1324 of information 1304 may be in portion 126 of information 104 or piece 1326 of information 1304 may be portion 126 of information 104.

In addition to or in place of indicating when information is usable, temporal data 1322 may indicate when information 1304 changes. For example, temporal data 1322 may indicate when information 1304 was changed.

In this illustrative example, temporal data 1322 is bi-temporal data 1328 when temporal data 1322 indicates at least one of change date 1330 or effective date 1332. In other words, bi-temporal data 1328 may have two types of data with respect to describing information 1304 over time.

As depicted, change date 1330 indicates when information 1304 was changed. Change date 1330 is a date-time that identifies when a physical change to data has occurred. For example, change date 1330 may be a date-time when a transaction that has changed information 1304 occurs. Effective date 1332 indicates when information 1304 is useable.

As depicted, it may be desirable to have some or all of information 1304 associated with temporal data 1322. In this illustrative example, information manager 1316 manages associating temporal data 1322 with information 1304 when temporal data 1322 is needed.

For example, piece 1326 of information 1304 may not be associated with temporal data 1322. In this example, information manager 1316 identifies piece 1326 of information 1304 without temporal data 1322. Information manager 1316 identifies temporal data 1322 for piece 1326 of information 1304. This identification is made in this example based on policy 1336. Policy 1336 is one or more rules used to identify temporal data 1322 that should be associated with piece 1326 of information 1304. Policy 1336 may also include data that is applied to the rules in policy 1336.

Information manager 1316 associates temporal data 1322 identified for piece 1326 of information 1304 with piece 1326 of information 1304. With this processing, information 1304 may be in a form more desirable for use in responding to requests 1318 for information 1304 from client computer systems 1320.

For example, during operation of information manager 1316, information manager 1316 may associate temporal data 1322 with information 1304 received from sources 1312 of information 1304 that does not have temporal data 1322 when received from sources 1312. In this manner, the usability of information 1304 may be increased.

For example, temporal data 1322 may enable performing operation 1346 with increased accuracy. Temporal data 1322 may be taken into account with information 1304 to identify operation 1346, perform operation 1346, or both identify and perform operation 1346.

As depicted, information manager 1316 may respond to requests 1318 for information 1304 having temporal data 1322 associated with information 1304. For example, information manager 1316 may receive request 1338 for information 1304 from client computer system 1344 in client computer systems 1320.

As depicted, temporal data 1322 is associated with information 1304. In this illustrative example, temporal data 1322 indicates when information 1304 is useable. Information manager 1316 identifies piece 1326 of information 1304 corresponding to request 1338 using temporal data 1322.

Information manager 1316 returns response 1342 to request 1338 to client computer system 1344. In this example, response 1342 includes piece 1326 of information 1304, enabling performing operation 1346 using information 1304 with increased accuracy. In some illustrative examples, response 1342 may also include temporal data 1322 for piece 1326 of information 1304.

In one illustrative example, identifying piece 1326 of information 1304 by information manager 1316 may include identifying time period 1340 for request 1338 using temporal data 1322. Information manager 1316 identifies piece 1326 of information 1304 corresponding to request 1338 and corresponding to time period 1340 identified.

Thus, the illustrative example provides one or more technical solutions to the technical problem of information being usable at different times, changing over time, or both being usable at different times and changing over time in an information system. In one illustrative example, the technical solution uses temporal data 1322 to identify information 1304 to be returned to client computer system 1344.

In this manner, the usability and when changes are made to information 1304 may be taken into account in requests 1318 for information 1304 by client computer systems 1320. Additionally, temporal data 1322 may be returned with information 1304 that is responsive to requests 1318. This temporal data may be used or taken into account when using information 1304 to identify or perform operation 1346.

As a result, computer system 1310 operates as a special purpose computer system in which information manager 1316 in computer system 1310 enables easier access to information 1304 by client computer systems 1320. The easier access occurs in one illustrative example through the use of temporal data 1322. The access also includes identifying time period 1340 for request 1338 using temporal data 1322. Thus, information manager 1316 transforms computer system 1310 into a special purpose computer system as compared to currently available general computer systems that do not have information manager 1316.

Computer system 1310 in location 1308 performs a transformation of information 1304. For example, computer system 1310 aggregates information 1304 from sources 1312 into location 1308. As depicted, location 1308 is between sources 1312 and the consumers of information 1304, client computer systems 1320. Further, temporal data 1322 may be identified and associated with information 1304. In this example, client computer systems 1320 may access and use information 1304 more easily from location 1308 with the association of temporal data 1322 with information 1304. As described above, temporal data 1322 may or may not be returned with information 1304 that is responsive to requests 1318.

Figure 14:
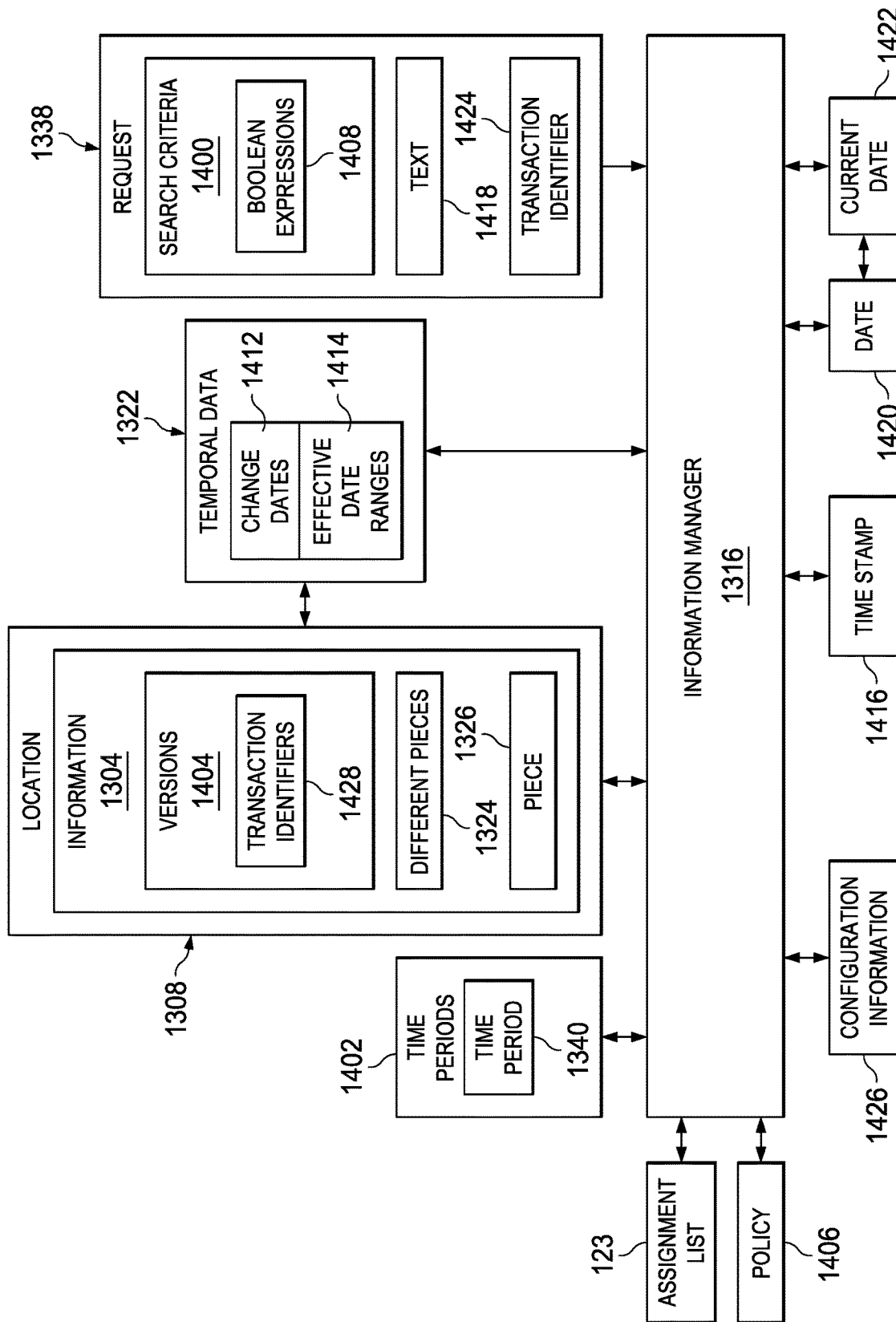
FIG. 14 is an illustration of a block diagram of data flow for identifying a time period for a request in accordance with an illustrative embodiment.

Turning to FIG. 14, an illustration of a block diagram of data flow for identifying a time period for a request is depicted in accordance with an illustrative embodiment. In this figure, an example of data flow for a process for identifying time period 1340 for request 1338 through information manager 1316 is shown. In this illustration, information manager 1316 identifies time period 1340 for request 1338 using temporal data 1322. In this illustrative example, time period 1340 is selected from at least one of a change date or an effective date.

In this illustrative example, information manager 1316 identifies time period 1340 for request 1338. As depicted, information manager 1316 identifies piece 1326 of information 1304 in location 1308 based on search criteria 1400 for request 1338. Information manager 1316 also identifies a group of time periods 1402 from temporal data 1322 for piece 1326 in which a group of versions 1404 of piece 1326 of information 1304 are useable. Information manager 1316 further identifies time period 1340 from the group of time periods 1402 based on policy 1406 for selecting time periods for requests.

As depicted, information manager 1316 receives request 1338. In this illustrative example, request 1338 includes search criteria 1400. Search criteria 1400 is an example of search criteria 206 in FIG. 2. Search criteria 1400 includes a group of boolean expressions 1408. The group of boolean expressions 1408 is an example of the group of boolean expressions 207 in FIG. 2. Information manager 1316 identifies piece 1326 of information 1304 in location 1308 based on the group of boolean expressions 1408 in search criteria 1400.

For example, search criteria 1400 may include a boolean expression indicating the name value pair "employee": "*Smith." In this example, search criteria 1400 is a request for piece 1326 of information 1304 indicated by a name value pair with the name "employee" and a value that matches any text that ends with "Smith." For example, when a value for a named value pair with the name "employee" in a portion of the information includes the value "Tom Smith," the portion indicates a match for search criteria 1400.

In this illustrative example, information 1304 includes versions 1404 of data objects in location 1308. A version of a data object is a form of the data object that is different from other versions of the data object. The difference between two versions of a data object is selected from at least one of a change to the format of the information in the data object and a change to the information in the data object.

For example, when the data object is a full name of a person and the full name of the person changes on a certain date, the first version of the full name is the name before the change and the second version of the full name is the name after the change. In this example, when the format of the full name changes after the full name of the person has changed, a third version of the full name is the version of the full name in the changed format.

As depicted, temporal data 1322 includes change dates 1412 for versions 1404 and effective date ranges 1414 for versions 1404. Change dates 1412 are examples of change date 1330 in FIG. 13. Effective date ranges 1414 specify when the versions of data objects are useable.

Information manager 1316 identifies the group of versions 1404 of piece 1326 in information 1304. Information manager 1316 next identifies the group of time periods 1402 for the group of versions 1404 of piece 1326 of information 1304 from effective date ranges 1414 for versions 1404.

As depicted, time period 1340 is in the group of time periods 1402. In this example, information manager 1316 identifies time period 1340 from the group of time periods 1402 based on policy 1406 for selecting time periods for requests.

In this illustrative example, policy 1406 uses at least one of time stamp 1416 for when the request was created or received, text 1418 in request 1338 that identifies date 1420 relative to current date 1422, transaction identifier 1424 corresponding to request 1338, configuration information 1426 for at least one of a client computer system that sent request 1338 or a source of the group of versions 1404 of piece 1326 of information 1304, or some other suitable type of information in information environment 1300 for identifying time period 1340.

Information manager 1316 identifies time stamp 1416. Time stamp 1416 is a date-time of request 1338. Time stamp 1416 is selected from at least one of when request 1338 was created or when request 1338 was received. When policy 1406 uses time stamp 1416 to identify time period 1340, time period 1340 is the time period in the group of time periods 1402 in which time stamp 1416 is useable. A date-time is useable in a time period when the date-time is within the time period. For example, when a time period is between yesterday and tomorrow, yesterday, today, and tomorrow are useable date-times within the time period.

Text 1418 in request 1338 is selected from at least one of latest useable effective date range, effective as of next week, effective as of next month, effective as of next quarter, effective as of next calendar year, or some other suitable text for identifying a date relative to current date 1422. Current date 1422 is the current system date of at least one of a client computer system that sent request 1338, a source of versions 1404 of piece 1326 of information 1304, computer system 1310, or some other suitable current system date for information environment 1300. The current system date of a computer system is the date currently set for the computer system.

Information manager 1316 identifies date 1420 based on current date 1422 and text 1418. For example, when text 1418 is "effective as of next month" and current date 1422 is Apr. 23, 2015, information manager 1316 sets date 1420 to May 1, 2015. When policy 1406 uses text 1418 to identify time period 1340, time period 1340 is the time period in the group of time periods 1402 in which date 1420 is useable.

In this illustrative example, versions 1404 include transaction identifiers 1428. A transaction identifier is an identifier that points to a group of versions of a group of data objects. For example, the transaction identifier may be alpha numeric text that represents a group of changes to a group of data objects.

Information manager 1316 identifies transaction identifier 1424 in request 1338. When policy 1406 uses transaction identifier 1424 to identify time period 1340, time period 1340 is the time period in time periods 1402 in which a version of piece 1326 in the group of versions 1404 of piece 1326 includes transaction identifier 1424 as an identifier of the transaction that created the version.

As depicted, information manager 1316 identifies configuration information 1426 for at least one of a client computer system that sent request 1338, a source of versions 1404 of piece 1326 of information 1304, or some other suitable computer system or organization in information environment 1300. As depicted, configuration information 1426 selects when policy 1406 uses at least one of time stamp 1416 for when the request was created or received, text 1418 in request 1338 that identifies date 1420 relative to current date 1422, or transaction identifier 1424 corresponding to request 1338 to identify time period 1340.

Figure 15:
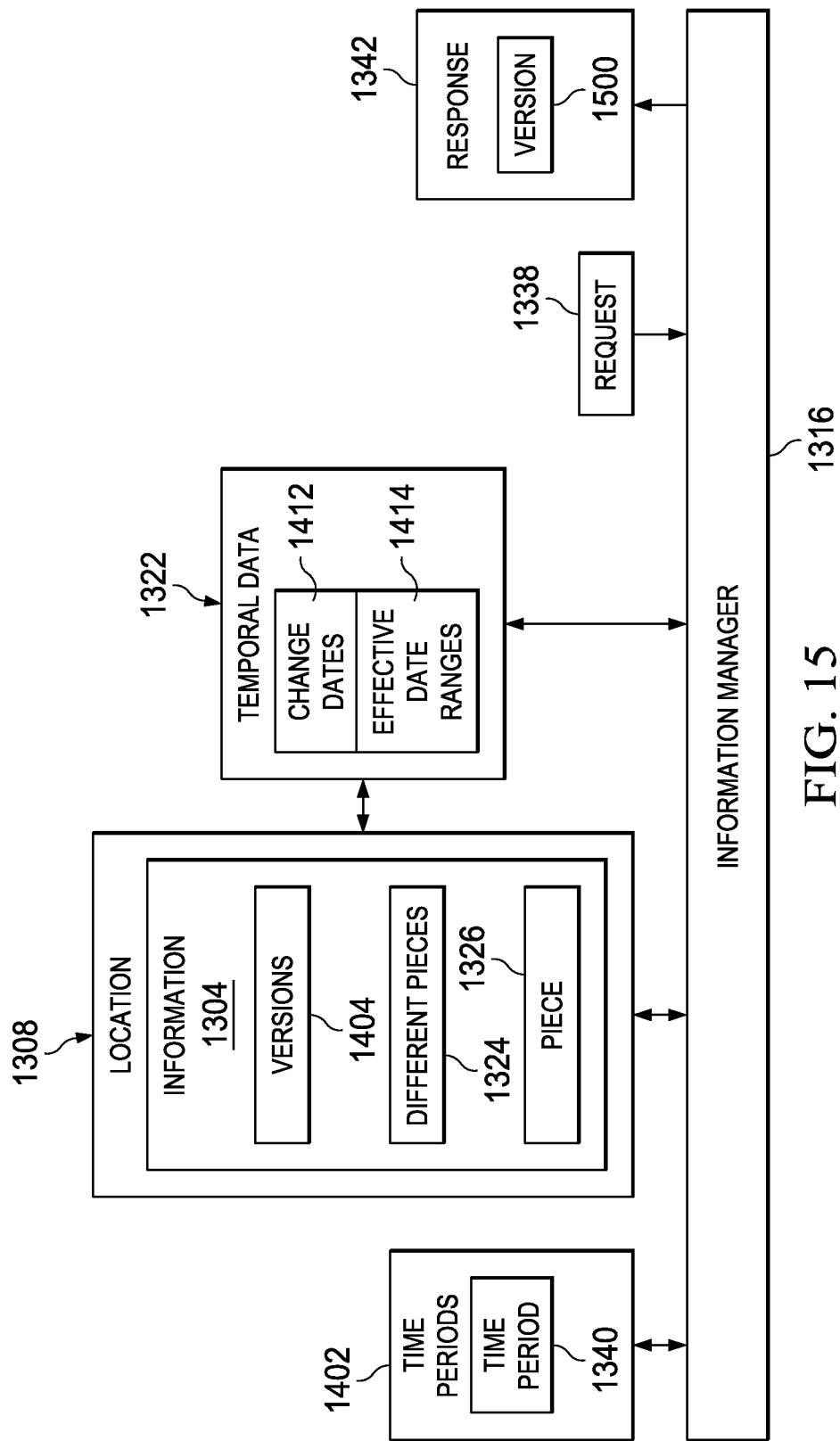
FIG. 15 is an illustration of a block diagram of data flow for identifying a piece of information corresponding to a time period in accordance with an illustrative embodiment.

Turning next to FIG. 15, an illustration of a block diagram of data flow for identifying a piece of information corresponding to a time period is depicted in accordance with an illustrative embodiment. In this figure, an example of data flow for a process for identifying piece 1326 of information 1304 through information manager 1316 is shown. In this illustrative example, information manager 1316 identifies piece 1326 of information 1304 corresponding to request 1338 and corresponding to time period 1340.

As depicted, information manager 1316 identifies version 1500 of piece 1326 from the group of versions 1404 of piece 1326. Version 1500 is the version of piece 1326 that is useable during time period 1340.

Information manager 1316 generates response 1342. In this illustrative example, information manager 1316 includes version 1500 of piece 1326 in response 1342.

Figure 16:
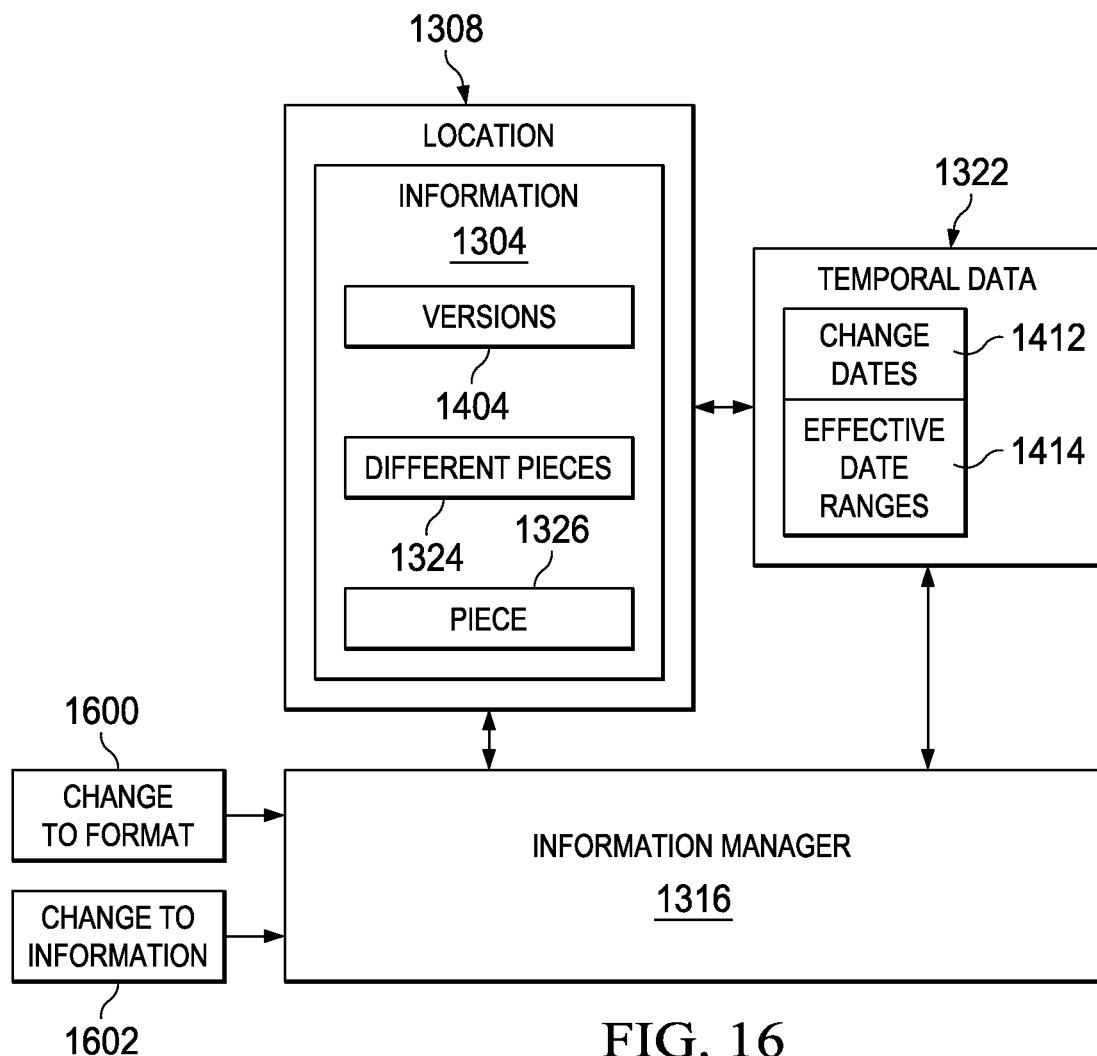
FIG. 16 is an illustration of a block diagram of data flow for identifying a piece of information without temporal data in accordance with an illustrative embodiment.

Turning now to FIG. 16, an illustration of a block diagram of data flow for identifying a piece of information without temporal data is depicted in accordance with an illustrative embodiment. In this figure, an example of data flow for a process for identifying piece 1326 of information 1304 without temporal data 1322 through information manager 1316 is shown.

In this illustrative example, information manager 1316 searches information 1304 for piece 1326 of information 1304 without temporal data 1322. Piece 1326 of information 1304 without temporal data 1322 is a piece of information 1304 in which at least one of a change date is not present in temporal data 1322 for a version of the piece or an effective date range is not present in temporal data 1322 for a version of the piece.

As depicted, information manager 1316 also identifies when change to format 1600 for a piece of information 1304 does not include temporal data 1322 for the change. Information manager 1316 further identifies when change to information 1602 for a piece of information 1304 does not include temporal data 1322 for the change. Information manager 1316 identifies the piece as piece 1326 of information 1304 without temporal data 1322 when these changes do not include temporal data 1322 for the change to the piece of information 104.

Figure 17:
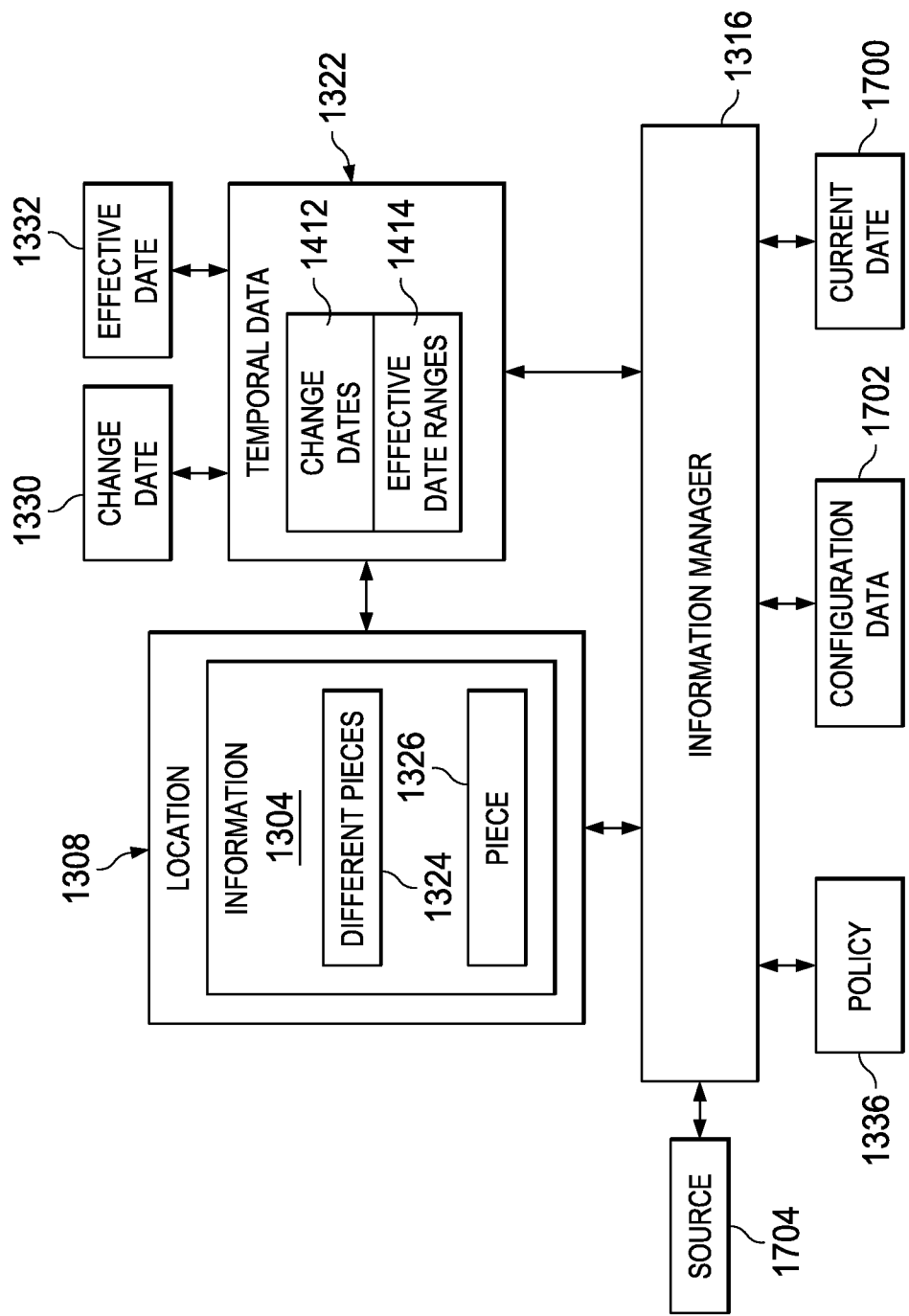
FIG. 17 is an illustration of a block diagram of data flow for identifying temporal data in accordance with an illustrative embodiment.

In FIG. 17, an illustration of a block diagram of data flow for identifying temporal data is depicted in accordance with an illustrative embodiment. In this figure, an example of data flow for a process for identifying temporal data 1322 for piece 1326 of information 1304 through information manager 1316 is shown. In this illustrative example, information manager 1316 identifies temporal data 1322 based on policy 1336.

As disclosed above in FIG. 13, policy 1336 identifies temporal data 1322 for piece 1326 of information 1304. In this illustrative example, policy 1336 uses at least one of current date 1700, configuration data 1702 for source 1704 of piece 1326 of information 1304, or some other suitable type of information in information environment 1300 for identifying temporal data 1322 for piece 1326 of information 1304.

In this illustrative example, current date 1700 is the current system date of at least one of source 1704 of piece 1326 of information 1304, computer system 1310, or some other suitable current system date for information environment 1300. Source 1704 is an example of a source in sources 1312. When policy 1336 uses current date 1700 to identify temporal data 1322, change date 1330 for piece 1326 is set to current date 1700 and effective date 1332 for piece 1326 is also set to current date 1700.

As depicted, configuration data 1702 for source 1704 is program code that identifies temporal data 1322 for piece 1326 of information 1304. In this illustrative example, configuration data 1702 may identify temporal data 1322 for piece 1326 of information 1304 when temporal data 1322 is unavailable from source 1704. When policy 1336 uses configuration data 1702 to identify temporal data 1322, the program code in configuration data 1702 for source 1704 is executed to set current date 1700 and effective date 1332 for piece 1326.

Figure 18:
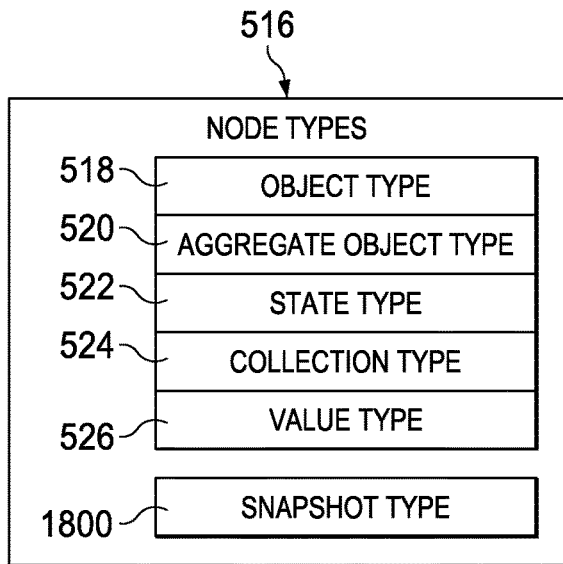
FIG. 18 is an illustration of a block diagram of node types in accordance with an illustrative embodiment.

With reference next to FIG. 18, an illustration of a block diagram of node types is depicted in accordance with an illustrative embodiment. In this illustration, node types 516 include object type 518, aggregate object type 520, state type 522, collection type 524, value type 526, and snapshot type 1800. As disclosed above in FIG. 5, each node type 512 of a node in nodes 502 in graph database 500 is selected from at least one of node types 516 or some other suitable type for representing portions of information as nodes 502 in graph database 500.

Snapshot type 1800 is the node type of nodes in nodes 502 in which versions of different pieces 1324 of information 1304 are stored in graph database 500. A snapshot is a version of an object that is located in a database.

As another illustrative example, when multiple versions are present for piece 1326 of information 1304, multiple snapshots contained in the object correspond to the multiple versions of piece 1326. In this example, each version of piece 1326 is contained in a snapshot that represents the version of piece 1326 of information 1304.

For example, when piece 1326 of information 1304 includes a name formed by a first name and a last name, the name is an object with the first name and the last name. In this example, the name may be a first version of the name for a first snapshot. If the name is changed, a second version of the name may be stored as a second version of the name for a second snapshot.

As another illustrative example, when piece 1326 of information 1304 includes a customer list with names and contact information, the customer list is an object that includes a list of names and contact information. In this example, the contact information is also an object. When the contact information is changed for a customer in the customer list, a first snapshot may be created for the original contact information and a second snapshot may be created for the changed contact information.

Figure 19:
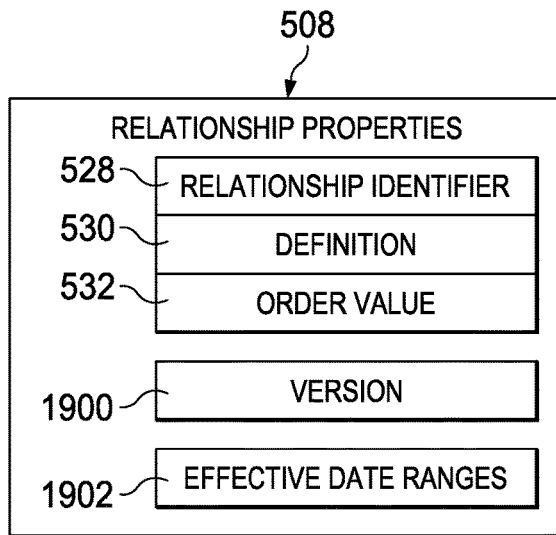
FIG. 19 is an illustration of a block diagram of relationship properties in accordance with an illustrative embodiment.

With reference now to FIG. 19, an illustration of a block diagram of relationship properties is depicted in accordance with an illustrative embodiment. In this illustration, relationship properties 508 include relationship identifier 528, definition 530, order value 532, version 1900, and effective date ranges 1902. As disclosed above in FIG. 5, relationship properties 508 are the properties of relationships 504 in graph database 500.

As depicted, version 1900 is a value specifying the version of a snapshot of an object. The value specifying the version of the snapshot is at least one of a number, an alphanumeric sequence of characters, or some other suitable value that indicates the order in a sequence of snapshots contained in an object. As another example, when piece 1326 of information 1304 has two versions, version 1900 for the first version may specify a value of "1" and version 1900 for the second version may specify a value of "2."

In this illustrative example, effective date ranges 1902 are dates specifying at least one of when pieces of information are useable or when pieces of information are unusable. For example, when piece 1326 of information 1304 has two versions, effective date ranges 1902 for the first version may specify a first range of dates for when the first version is useable, and effective date ranges 1902 for the second version may specify a second range of dates for when the second version is useable.

Figure 20:
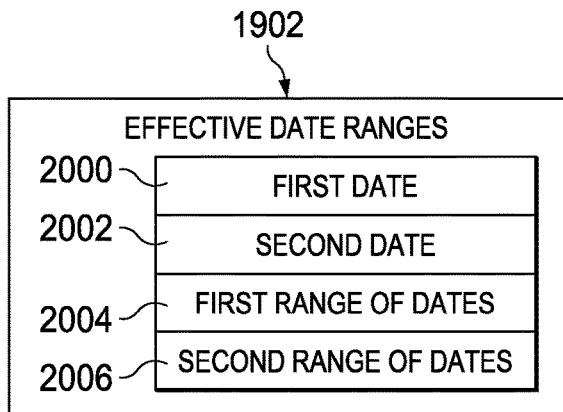
FIG. 20 is an illustration of a block diagram of effective date ranges in accordance with an illustrative embodiment.

Turning to FIG. 20, an illustration of a block diagram of effective date ranges is depicted in accordance with an illustrative embodiment. In this illustration, a number of properties of effective date ranges 1902 that specify when pieces of information are useable are shown. In this illustrative example, effective date ranges 1902 include first date 2000 indicating when a piece of information becomes useable, second date 2002 indicating when the piece of information becomes unusable, first range of dates 2004 during which the information is useable, and second range of dates 2006 during which the information is unusable.

Figure 21:
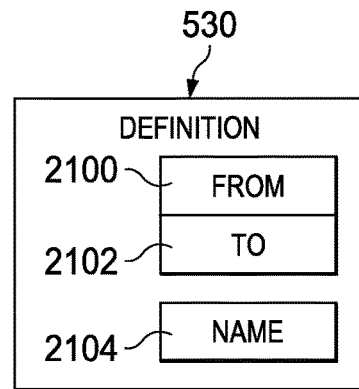
FIG. 21 is an illustration of a block diagram of a definition in accordance with an illustrative embodiment.

Turning next to FIG. 21, an illustration of a block diagram of a definition is depicted in accordance with an illustrative embodiment. In this illustration, a number of properties of definition 530 are shown. As discussed above in the description of FIG. 5, definition 530 defines the relationship between two nodes in graph database 500.

In this illustrative example, definition 530 includes from 2100, to 2102, and name 2104. From 2100 is a pointer to a first node from which a relationship is defined. To 2102 is a pointer to a second node for which the relationship is defined. Name 2104 is the name of the second node. For example, when to 2102 points to a node that represents a "legal name," name 2104 is "legal name."

Figure 22:
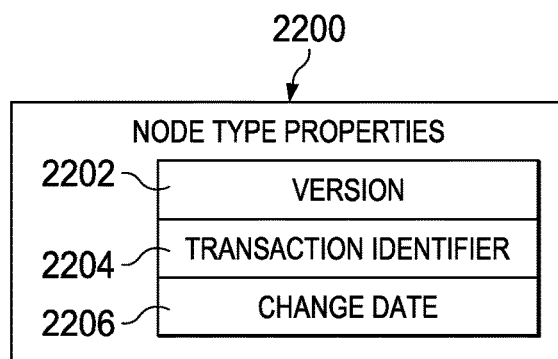
FIG. 22 is an illustration of a block diagram of node type properties for a snapshot in accordance with an illustrative embodiment.

Turning now to FIG. 22, an illustration of a block diagram of node type properties for a snapshot is depicted in accordance with an illustrative embodiment. In this illustrative example, node type properties 2200 are an example of node type properties 514 in node properties 506 in FIG. 5. In this illustration, node type properties 2200 are for a node in nodes 502 that represents a snapshot of an object.

As depicted, node type properties 2200 include version 2202, transaction identifier 2204, and change date 2206. In this illustrative example, version 2202 is a value specifying the version of the snapshot. Transaction identifier 2204 is a pointer to a change for which the snapshot was created. For example, transaction identifier 2204 may point to change to information 1602. In this illustrative example, change date 2206 is the change date for the snapshot.

The illustrations of information environment 1300 and the different components in information environment 1300 in FIGS. 13-22 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, temporal data 1322 may be associated with all of information 1304 or temporal data 1322 may be associated only with some of information 1304. In one illustrative example, a first piece of information 1304 may not be associated with temporal data 1322, while a second piece of information 1304 may be associated with temporal data 1322. In this manner, performing an operation may be made easier when the operation is identified using information that has been identified, analyzed, or both identified and analyzed using temporal data.

In the illustrative example, information manager 1316 is described as managing information 1304 and temporal data 1322. In different illustrative examples, information manager 1316 may also perform functions as described for information manager 130 in FIG. 1. For example, information manager 1316 may also facilitate the control of information 1304 by sources 1312. For example, information manager 1316 may determine which ones of sources 1312 may make changes to different ones of portions of information 1304.

Figure 23:
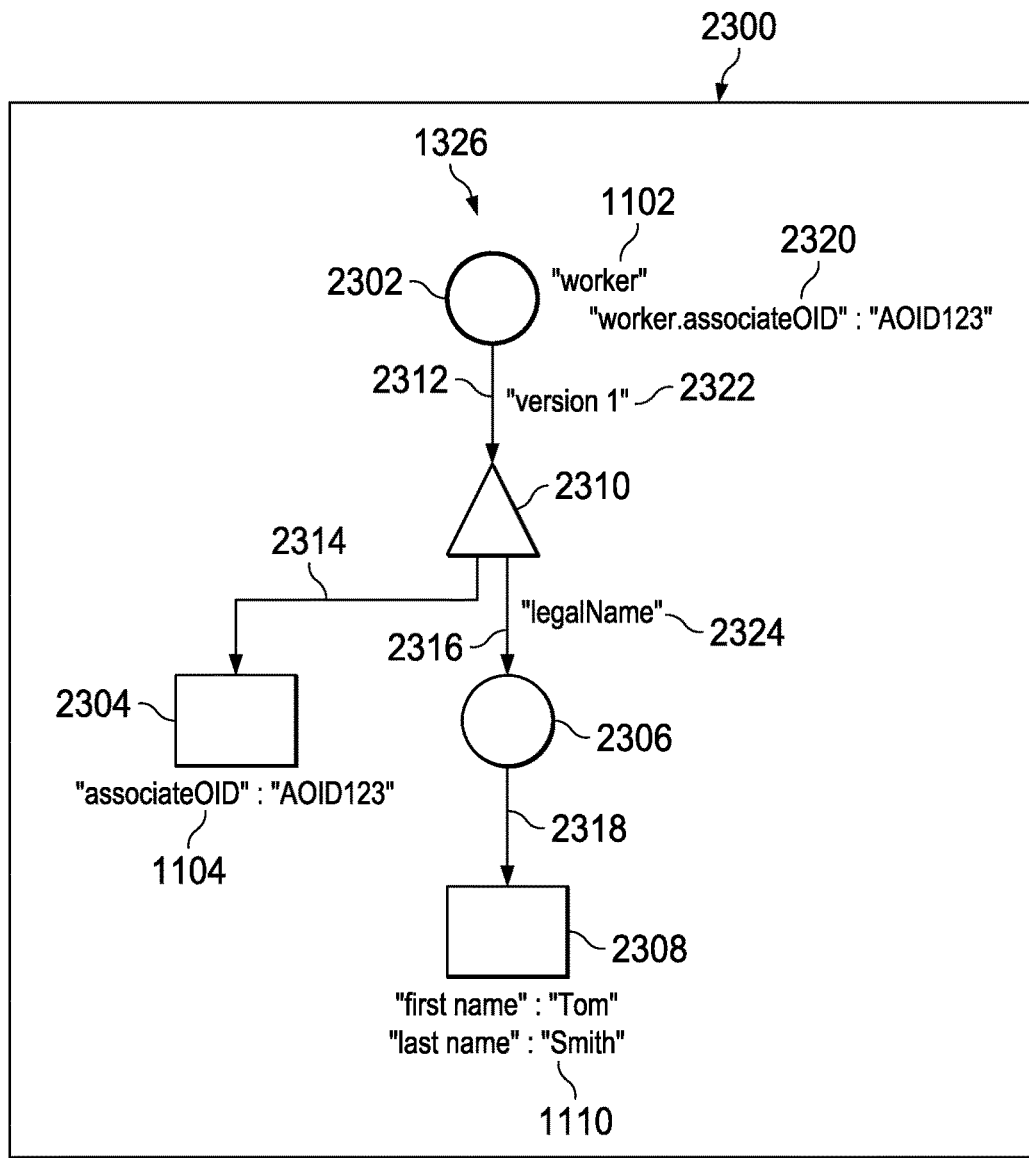
FIG. 23 is an illustration of a graph of information in accordance with an illustrative embodiment.

With reference to FIG. 23, an illustration of a graph of information is depicted in accordance with an illustrative embodiment. In this illustration, graph 2300 shows nodes 502 and relationships 504 of graph database 500 in FIG. 5. In particular, graph 2300 shows where information manager 1316 stores piece 1326 of information 1304 in graph database 500. In this illustrative example, piece 1326 includes information 104 from portion 1100 in FIG. 11.

As depicted, nodes 502 in graph 2300 include aggregate object 2302, state 2304, object 2306, state 2308, and snapshot 2310. Aggregate object 2302 is the node in graph database 500 where versions of piece 1326 are stored. In this illustrative example, piece 1326 is object 1102 from portion 1100. Snapshot 2310 is where version 1 of object 1102 is stored. In this illustrative example, version 1 of object 1102 includes information 1304 from portion 1100. State 2304 is where named value 1104 is stored. Object 2306 is where object 1106 is stored. State 2308 is where named values 1110 are stored.

In this illustrative example, relationships 504 in graph 2300 include relationship 2312 between aggregate object 2302 and snapshot 2310; relationship 2314 between snapshot 2310 and state 2304; relationship 2316 between snapshot 2310 and object 2306; and relationship 2318 between object 2306 and state 2308.

Aggregate object 2302 includes key 2320. Key 2320 is an example of key 706 in node type properties 700 in FIG. 7. In this illustrated example, key 2320 is a named value. Key 2320 indicates "worker.associateOID" has the value "AOID123."

As depicted, relationship 2312 has version 2322. Version 2322 is an example of version 1900 in relationship properties 508 in FIG. 19. In this illustrative example, version 2322 in relationship 2312 indicates snapshot 2310 is the first snapshot for aggregate object 2302.

In this illustrative example, relationship 2316 has name 2324. Name 2324 is an example of name 2104 in definition 530 in FIG. 21.

Figure 24:
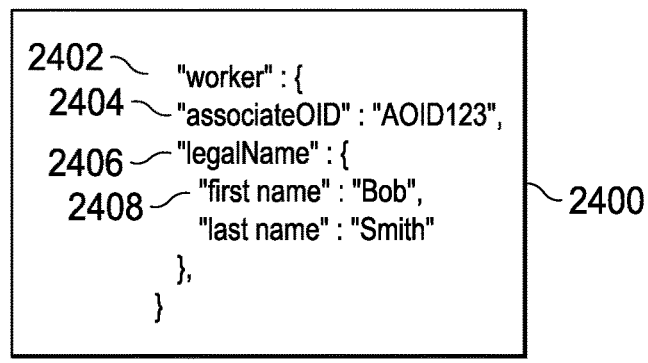
FIG. 24 is an illustration of a change to a portion of information in accordance with an illustrative embodiment.

With reference next to FIG. 24, an illustration of a change to a portion of information is depicted in accordance with an illustrative embodiment. In this illustration, change to information 2400 is an example of change to information 1602 in FIG. 16. As depicted, change to information 2400 is shown in text using JavaScript object notation. In particular, this figure shows text for an example of changing a legal name of a worker to "Bob Smith."

In this illustrative example, change to information 2400 includes object 2402. Object 2402 has the name "worker." Object 2402 includes named value 2404 and object 2406. Named value 2404 indicates "associateOID" has the value "AOID123."

As depicted, object 2406 has the name "legalName." Object 2406 includes named values 2408. Named values 2408 indicate "first name" has the value "Bob" and "last name" has the value "Smith."

Figure 25:
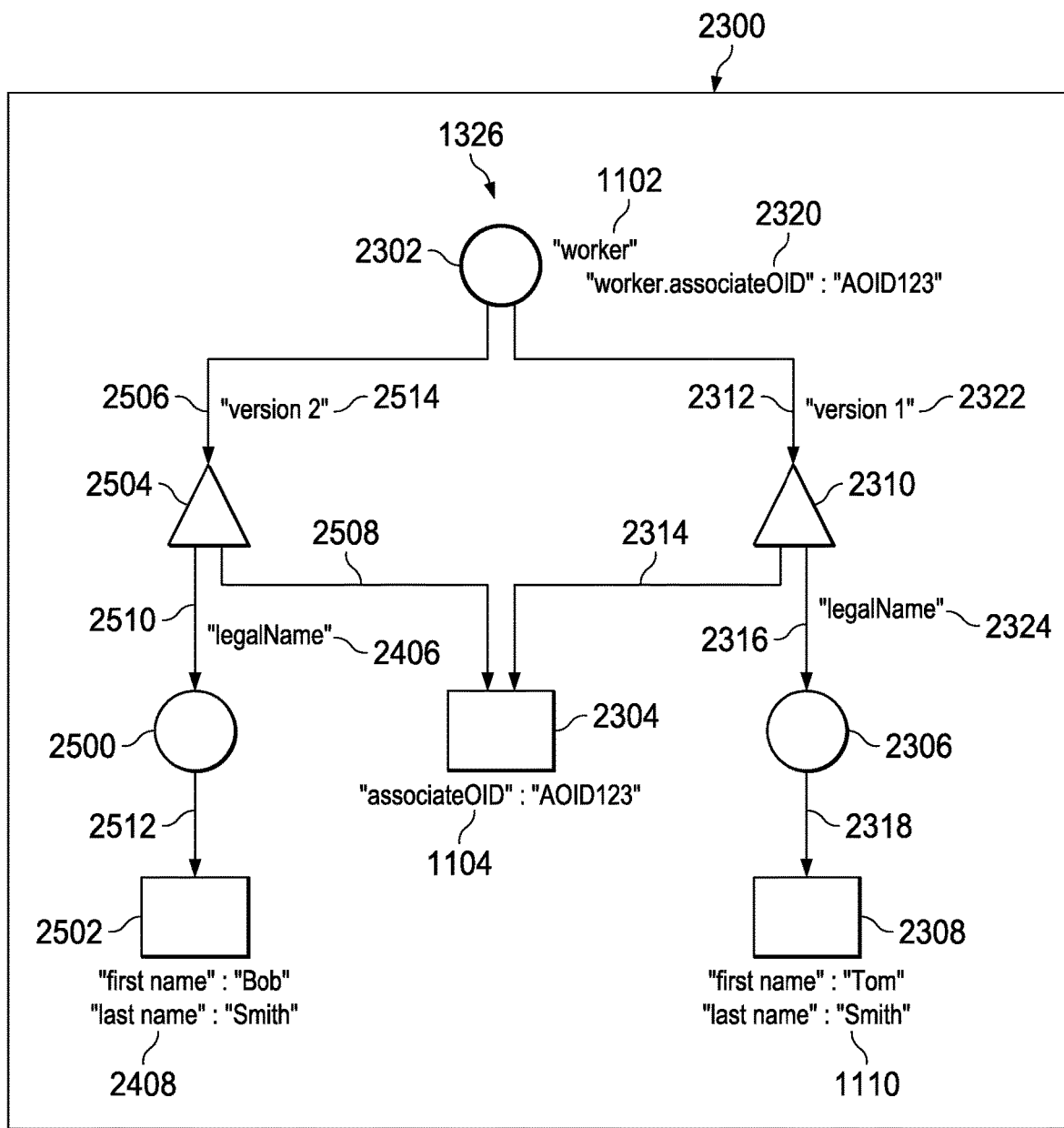
FIG. 25 is an illustration of a graph of information after a change to the information in accordance with an illustrative embodiment.

With reference now to FIG. 25, an illustration of a graph of information after a change to the information is depicted in accordance with an illustrative embodiment. In this illustration, graph 2300 shows nodes 502 and relationships 504 of graph database 500 in FIG. 5.

In this illustrative example, information manager 1316 has added change to information 2400 to graph 2300. In this illustrative example, version 2 of piece 1326 is from change to information 2400 in FIG. 24.

As depicted, nodes 502 in graph 2300 representing change to information 2400 include object 2500, state 2502, and snapshot 2504. Snapshot 2504 is where version 2 of object 1102 is stored. Object 2500 is where object 2406 is stored. State 2502 is where named values 2408 are stored.

In this illustrative example, relationships 504 in graph 2300 representing change to information 2400 include relationship 2506 between aggregate object 2302 and snapshot 2504; relationship 2508 between snapshot 2504 and state 2304; relationship 2510 between snapshot 2504 and object 2500; and relationship 2512 between object 2500 and state 2502. As depicted, relationship 2506 has version 2514. Version 2514 is an example of version 1900 in relationship properties 508 in FIG. 19. In this illustrative example, version 2514 in relationship 2506 indicates snapshot 2504 is the second snapshot for aggregate object 2302.

Figure 26:
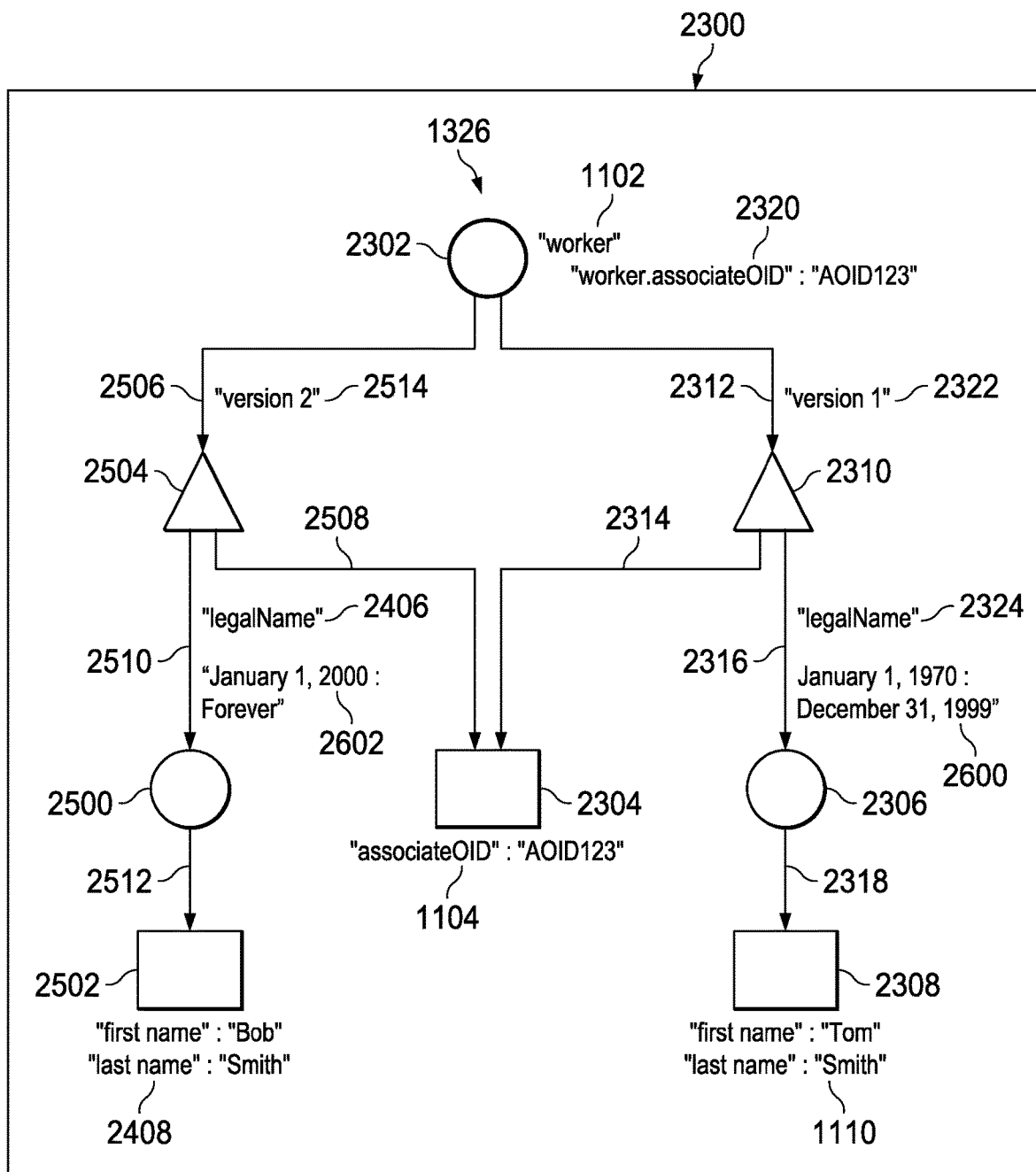
FIG. 26 is an illustration of a graph of information after a change to the information in accordance with an illustrative embodiment.

In FIG. 26, an illustration of a graph of information after a change to the information is depicted in accordance with an illustrative embodiment. In this illustration, examples of effective date ranges 1902 for a group of snapshots of aggregate object 2302 in graph 2300 are shown.

As depicted, range of dates 2600 for snapshot 2310 and range of dates 2602 for snapshot 2504 are examples of effective date ranges 1902 in FIG. 19. In this illustrative example, range of dates 2600 is between "Jan. 1, 1970" and "Dec. 31, 1999" and range of dates 2602 is between "Jan. 1, 2000" and "Forever." In this illustrative example, aggregate object 2302 has the first version of the legal name with first name Tom and last name Smith between the years 1970 and 1999 and the second version of the legal name with first name Bob and second name Smith from Jan. 1, 2000 to forever.

The illustration of graph 2300 in FIGS. 23, 25, and 26 does not limit the objects that can be in graph 2300. For example, additional information may also be shown in the graph as additional objects. As another example, some objects in graph 2300 may be omitted depending on information 1304. Further, graph 2300 may also be displayed in at least one of a graph or a table in a graphical user interface on a display of a computer system in information environment 1300.

The examples provided for data objects are not exhaustive. Additional examples may also work in addition to or in place of the ones provided. These examples may also be omitted depending on the implementation. For example, in FIG. 26 where piece 1326 of information 1304 has two versions, piece 1326 may also only have at least one of no versions, three versions, 10 versions, or any other suitable number of versions.

Figure 27:
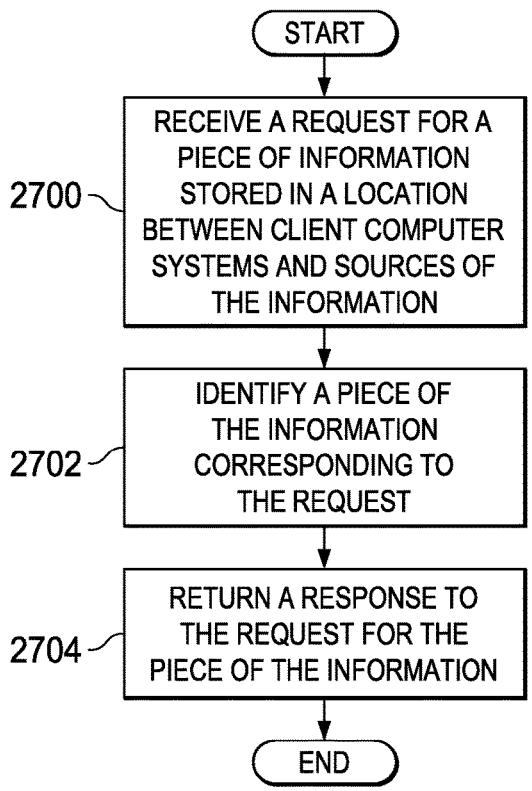
FIG. 27 is an illustration of a flowchart of a process for accessing information in accordance with an illustrative embodiment.

Turning next to FIG. 27, an illustration of a flowchart of a process for accessing information is depicted in accordance with an illustrative embodiment. The process illustrated in FIG. 27 may be implemented in information environment 100 in FIG. 1. In particular, the process may be implemented in information manager 130 in computer system 110.

The process begins by receiving a request for a piece of information stored in a location between client computer systems and sources of the information (step 2700). In step 2700, the information has formats for the information in the location and the formats for the information are controlled by the sources of the information. Also, each of the sources is assigned to control a group of portions of the information in the location.

The process identifies a piece of the information corresponding to the request (step 2702). The process returns a response to the request for the piece of the information (step 2704), with the process terminating thereafter. The process includes a technical solution to information having different formats and enables simplifying access to the information in different formats.

Figure 28:
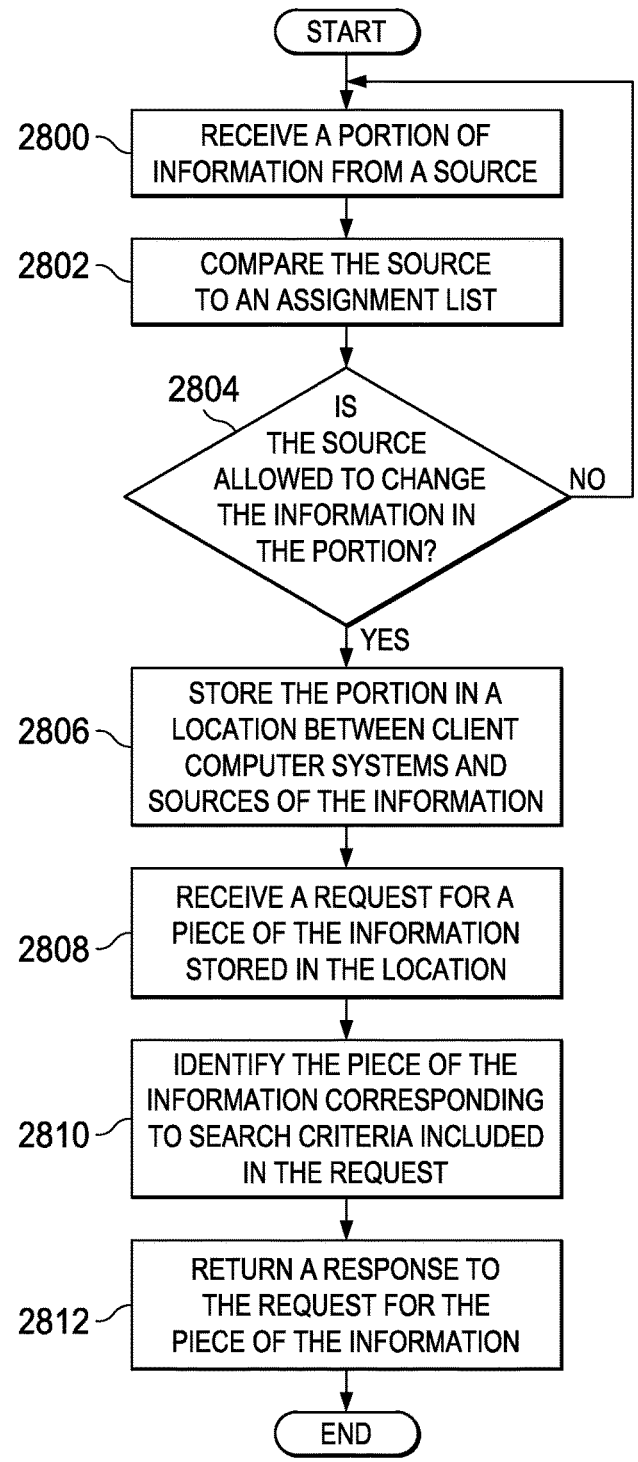
FIG. 28 is an illustration of a flowchart of a process for accessing information in accordance with an illustrative embodiment.

With reference to FIG. 28, an illustration of a flowchart of a process for accessing information is depicted in accordance with an illustrative embodiment. The process illustrated in FIG. 28 may be implemented in information environment 100 in FIG. 1. In particular, the process may be implemented in information manager 130 in computer system 110. These components may follow the data flow described in FIG. 2.

The process begins by receiving a portion of information from a source (step 2800). The process compares the source to an assignment list (step 2802). A determination is made as to whether the source is allowed to change the information in the portion (step 2804). If the source is not allowed to change the information in the portion, the process returns to step 2800.

As depicted, if the source is allowed to change information in the portion, the process stores the portion in a location between client computer systems and sources of the information (step 2806). The process next receives a request for a piece of the information stored in the location (step 2808).

The process identifies the piece of the information corresponding to search criteria included in the request (step 2810). The process returns a response to the request for the piece of the information (step 2812), with the process terminating thereafter.

Figure 29:
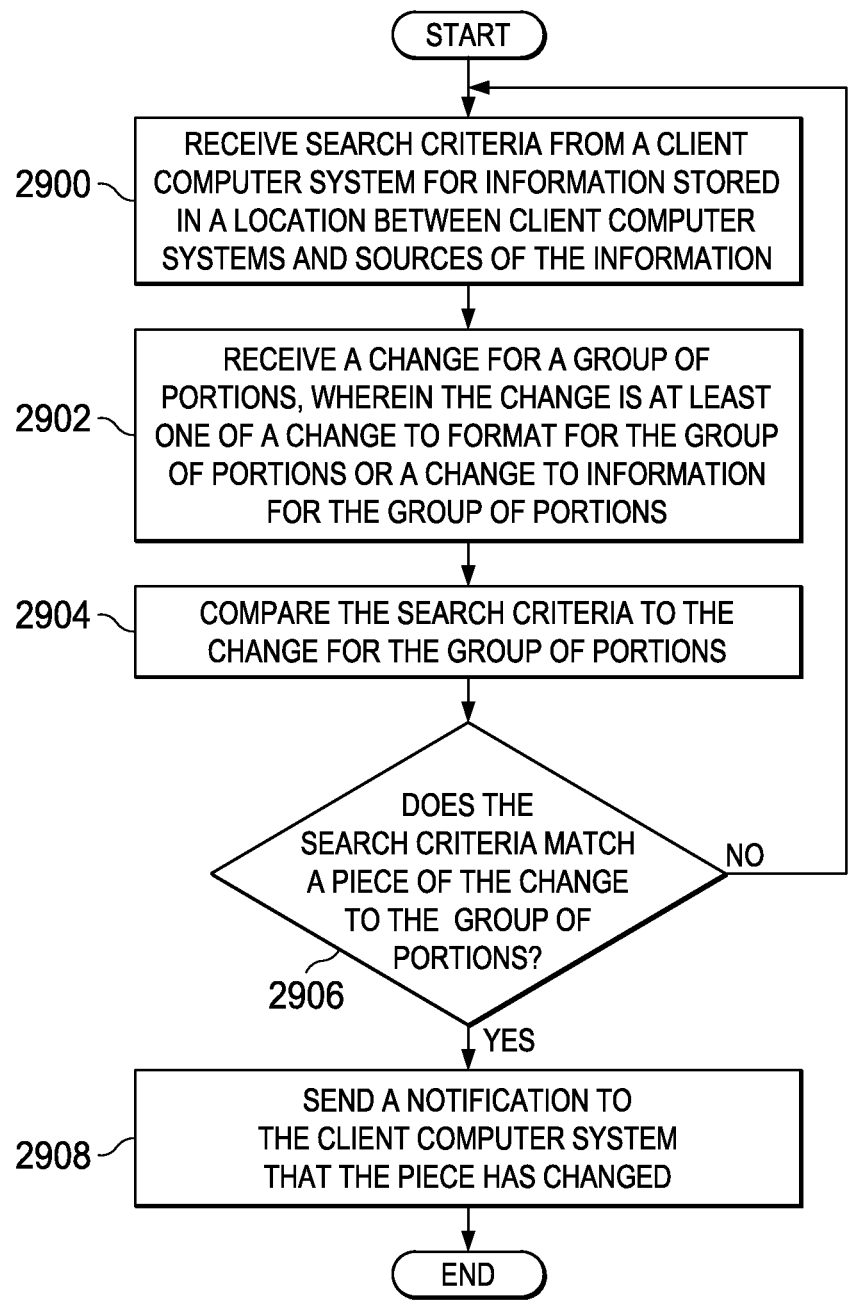
FIG. 29 is an illustration of a flowchart of a process for processing subscriptions in accordance with an illustrative embodiment.

With reference next to FIG. 29, an illustration of a flowchart of a process for processing subscriptions is depicted in accordance with an illustrative embodiment. The process illustrated in FIG. 29 may be implemented in information environment 100 in FIG. 1. In particular, the process may be implemented in information manager 130 in computer system 110. These components may follow the data flow described in FIG. 3.

The process begins by receiving search criteria from a client computer system for information stored in a location between client computer systems and sources of the information (step 2900). When the process receives the search criteria, the process may also receive a group of portions of the information to be sent to the client computer system when the search criteria is met. The process next receives a change for a group of portions, wherein the change is at least one of a change to format for the group of portions or a change to information for the group of portions (step 2902).

The process compares the search criteria to the change for the group of portions (step 2904). The process makes a determination of whether the search criteria matches a piece of the change to the group of portions (step 2906). If the search criteria do not match the piece of the change, the process returns to step 2900.

As depicted, when the search criteria matches the piece of the change, the process sends a notification to the client computer system that the piece has changed (step 1508), with the process terminating thereafter. The notification may include a copy of the group of portions of information requested to be sent to the client computer system when the search criteria is met.

Figure 30:
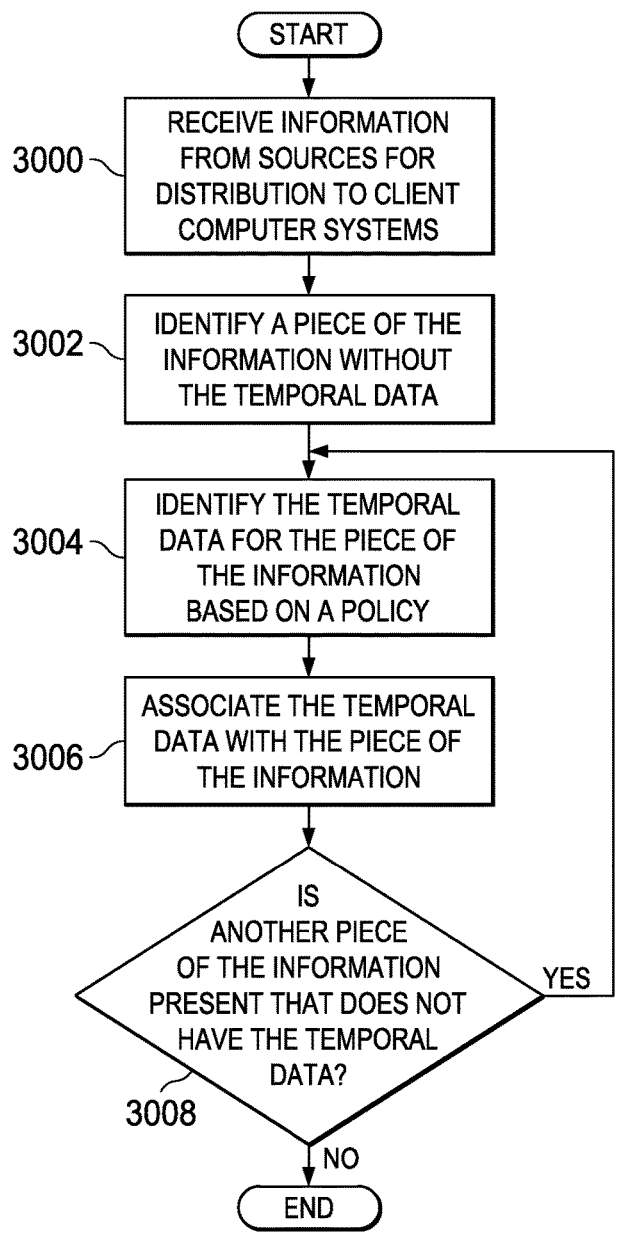
FIG. 30 is an illustration of a flowchart of a process for identifying temporal data for information in accordance with an illustrative embodiment.

With reference next to FIG. 30, an illustration of a flowchart of a process for identifying temporal data for information is depicted in accordance with an illustrative embodiment. The process illustrated in FIG. 30 may be implemented in information manager 1316 in computer system 1310 in FIG. 13.

The process begins by receiving information from sources for distribution to client computer systems (step 3000). The information may be information that is stored in a location or information that has been received for processing. In some cases, the temporal data may be associated with some of the information when information is received from the sources. In other cases, the temporal data may be completely absent when the information is received from the sources.

The process then identifies a piece of the information without the temporal data (step 3002). As depicted, step 3002 may be performed with respect to information located in location 1308 in computer system 1310 in FIG. 13.

The process identifies the temporal data for the piece of the information based on a policy (step 3004). The process associates the temporal data with the piece of the information (step 3006).

A determination is made as to whether another piece of the information is present that does not have the temporal data (step 3008). If another piece of the information is present without the temporal data, the process returns to step 3004. Otherwise, the process terminates. This process may be repeated any number of times until temporal data is associated with as much of the information is desired.

Figure 31:
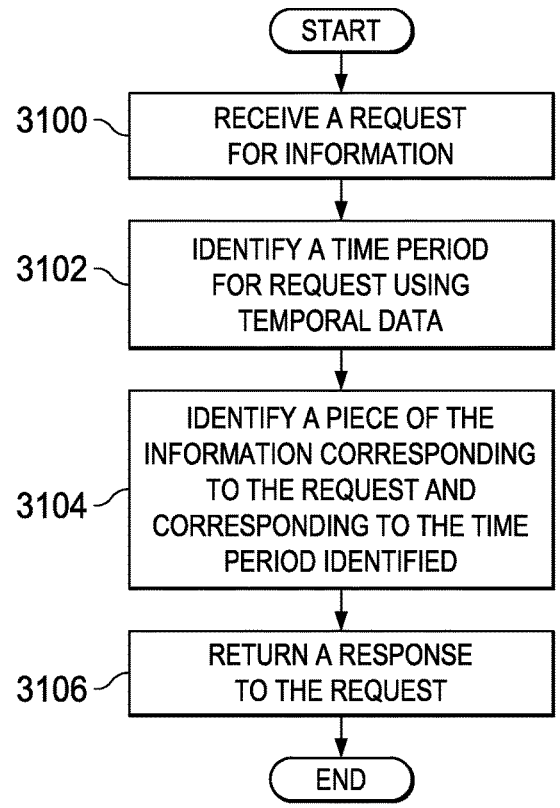
FIG. 31 is an illustration of a flowchart of a process for accessing information in accordance with an illustrative embodiment.

With reference now to FIG. 31, an illustration of a flowchart of a process for accessing information is depicted in accordance with an illustrative embodiment. The process illustrated in FIG. 31 may be implemented in information environment 1300 in FIG. 13. In particular, the process may be implemented in information manager 1316 in computer system 1310. This process takes into account when information is usable, when information is changed, or some combination thereof in responding to requests from a client computer system for information.

The process begins by receiving a request for information (step 3100). In step 3100, temporal data is associated with the information. The temporal data indicates when the information is useable in this example. In other examples, temporal data also may indicate when a change occurs to the information.

The process identifies a time period for the request using temporal data (step 3102). The process identifies a piece of the information corresponding to the request and corresponding to the time period identified (step 3104).

The process returns a response to the request (step 3106), with the process terminating thereafter. The response returned in step 3106 includes the piece of the information. Thus, this process enables performing an operation using the information with increased accuracy. By having information of data, operations may be identified with increased accuracy. Further, when the temporal data is returned with the information, the temporal data may be taken into account in the analysis to increase accuracy in an identifying operation to be performed.

Figure 32:
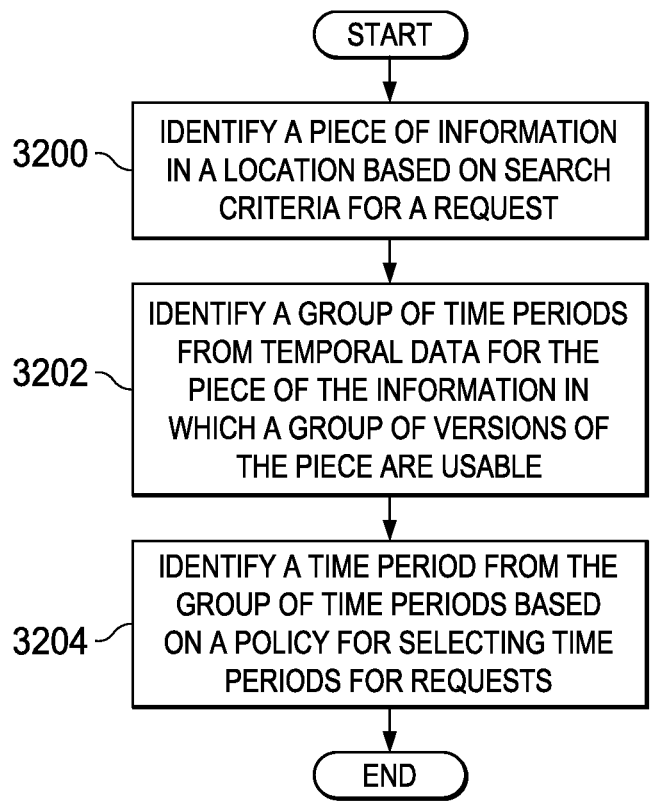
FIG. 32 is an illustration of a flowchart of a process for identifying a time period for a request in accordance with an illustrative embodiment.

With reference now to FIG. 32, an illustration of a flowchart of a process for identifying a time period for a request is depicted in accordance with an illustrative embodiment. The process illustrated in FIG. 32 may be implemented in information environment 1300 in FIG. 13. In particular, the process may be implemented in information manager 1316 in computer system 1310. The steps in this process are an example of steps that implement step 3102 in FIG. 31.

The process begins by identifying a piece of information in a location based on search criteria for a request (step 3200). The process next identifies a group of time periods from temporal data for the piece of the information in which a group of versions of the piece are useable (step 3202).

The process then identifies a time period from the group of time periods based on a policy for selecting time periods for requests (step 3204), with the process terminating thereafter. The policy in step 3204 is policy 1406 in FIG. 14.

Figure 33:
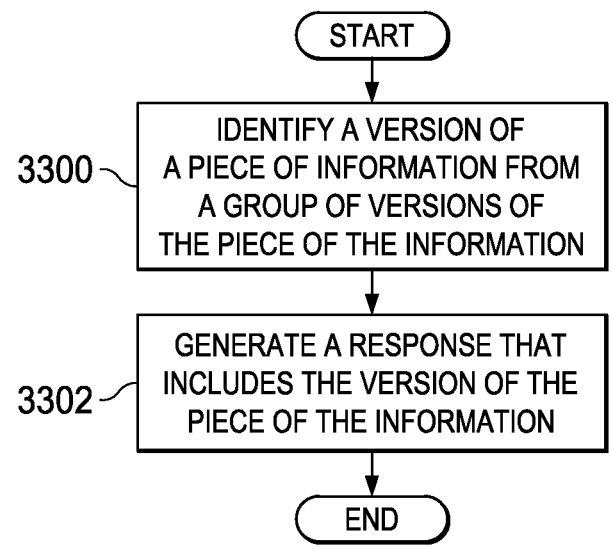
FIG. 33 is an illustration of a flowchart of a process for identifying a piece of information for a request corresponding to a request and corresponding to a time period in accordance with an illustrative embodiment.

With reference now to FIG. 33, an illustration of a flowchart of a process for identifying a piece of information for a request corresponding to a request and corresponding to a time period is depicted in accordance with an illustrative embodiment. The process illustrated in FIG. 33 may be implemented in information environment 1300 in FIG. 13. In particular, the process may be implemented in information manager 1316 in computer system 1310. The steps in this process are an example of steps that implement step 3104 in FIG. 31.

The process begins by identifying a version of a piece of information from a group of versions of the piece of the information (step 3300). The group of versions of the piece of the information correspond to a request. The version identified is the version of the piece of the information that is useable during a time period. Thus, the version of the piece identified corresponds to the time period. The process next generates a response that includes the version of the piece of the information (step 3302), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 28 may perform steps 2800, 2802, 2804, and 2806 substantially concurrently with steps 2808, 2810, and 2812. In this example, the process processes the portion of information received from the source and the request from the client computer system substantially concurrently. As another example, the process in FIG. 28 may include an additional step to notify the source when the process has determined that the source is not allowed to change information in the portion.

In an illustrative example, step 3102 may be omitted. In this example, step 3104 may identify a piece of the information corresponding to the request based on when the information is useable as indicated by the temporal data associated with the information.

Figure 34:
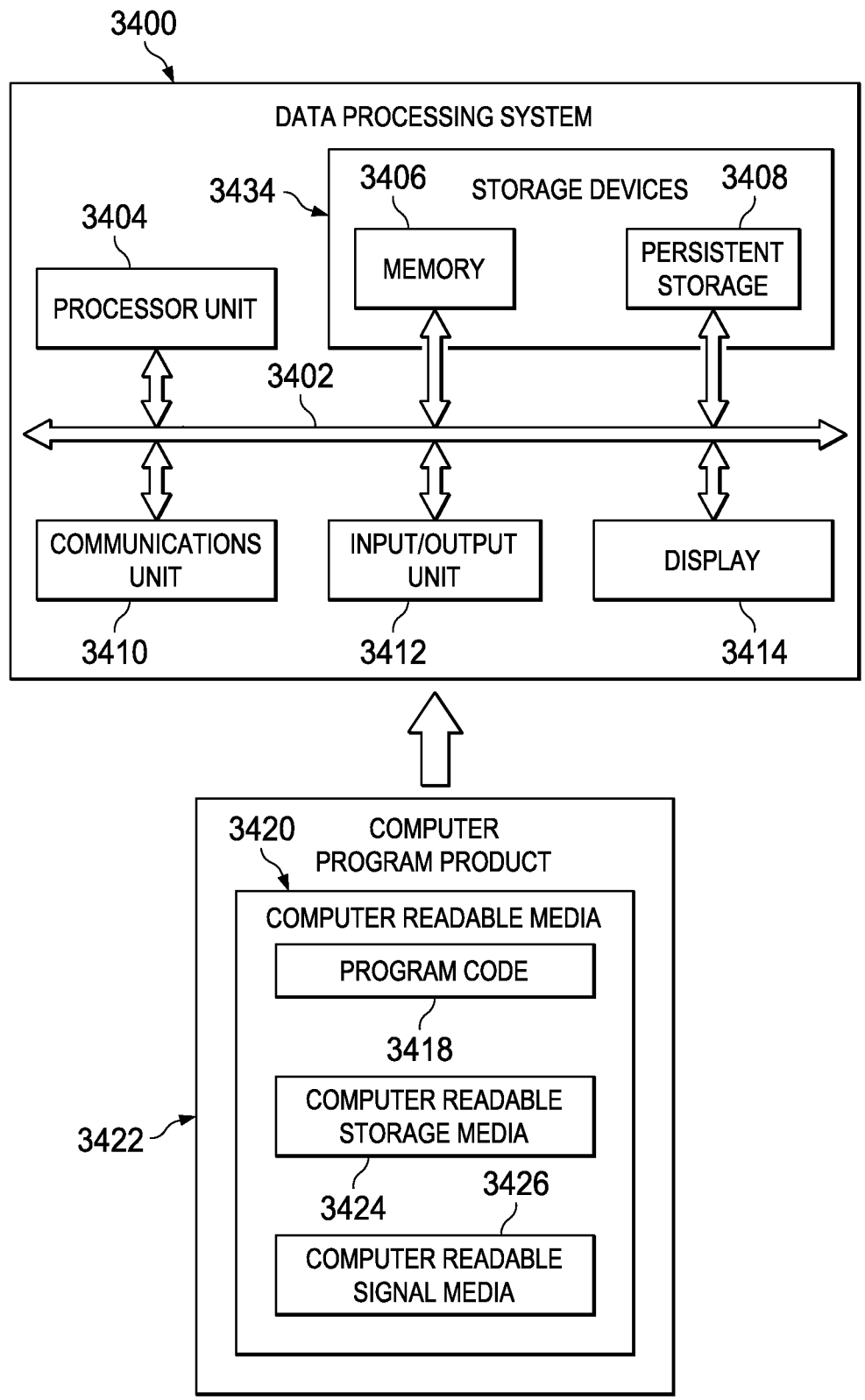
FIG. 34 is an illustration of a block diagram of a data processing system in accordance with an illustrative embodiment.

Turning now to FIG. 34, an illustration of a block diagram of a data processing system is depicted in accordance with an illustrative embodiment. Data processing system 3400 may be used to implement computer system 110 and client computer systems 134. In this illustrative example, data processing system 3400 includes communications framework 3402, which provides communications between processor unit 3404, memory 3406, persistent storage 3408, communications unit 3410, input/output (I/O) unit 3412, and display 3414. In this example, communications framework 3402 may take the form of a bus system.

Processor unit 3404 serves to execute instructions for software that may be loaded into memory 3406. Processor unit 3404 may be a number of processors, a multi-processor core, or some other type of processor, depending on the particular implementation.

Memory 3406 and persistent storage 3408 are examples of storage devices 3416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 3416 may also be referred to as computer readable storage devices in these illustrative examples. Memory 3406, in these examples, may be, for example, a random access memory or any other suitable volatile or non-volatile storage device. Persistent storage 3408 may take various forms, depending on the particular implementation.

For example, persistent storage 3408 may contain one or more components or devices. For example, persistent storage 3408 may be a hard drive, a flash memory, a rewritable optical disk, a rewritable magnetic tape, or some combination of the above. The media used by persistent storage 3408 also may be removable. For example, a removable hard drive may be used for persistent storage 3408.

Communications unit 3410, in these illustrative examples, provides for communications with other data processing systems or devices. In these illustrative examples, communications unit 3410 is a network interface card.

Input/output unit 3412 allows for input and output of data with other devices that may be connected to data processing system 3400. For example, input/output unit 3412 may provide a connection for user input through at least one of a keyboard, a mouse, or some other suitable input device. Further, input/output unit 3412 may send output to a printer. Display 3414 provides a mechanism to display information to a user.

Instructions for at least one of the operating system, applications, or programs may be located in storage devices 3416, which are in communication with processor unit 3404 through communications framework 3402. The processes of the different embodiments may be performed by processor unit 3404 using computer-implemented instructions, which may be located in a memory, such as memory 3406.

These instructions are referred to as program code, computer usable program code, or computer readable program code that may be read and executed by a processor in processor unit 3404. The program code in the different embodiments may be embodied on different physical or computer readable storage media, such as memory 3406 or persistent storage 3408.

Program code 3418 is located in a functional form on computer readable media 3420 that is selectively removable and may be loaded onto or transferred to data processing system 3400 for execution by processor unit 3404. Program code 3418 and computer readable media 3420 form computer program product 3422 in these illustrative examples. In one example, computer readable media 3420 may be computer readable storage media 3424 or computer readable signal media 3426.

In these illustrative examples, computer readable storage media 3424 is a physical or tangible storage device used to store program code 3418 rather than a medium that propagates or transmits program code 3418. Alternatively, program code 3418 may be transferred to data processing system 3400 using computer readable signal media 3426. Computer readable signal media 3426 may be, for example, a propagated data signal containing program code 3418. For example, computer readable signal media 3426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 3400 are not meant to provide architectural limitations to the manner in which different embodiments may be implemented. The different illustrative embodiments may be implemented in a data processing system including components in addition to or in place of those illustrated for data processing system 3400. Other components shown in FIG. 34 can be varied from the illustrative examples shown. The different embodiments may be implemented using any hardware device or system capable of running program code 3418.

Thus, the technical problem of information having different formats in an information system is solved through one or more technical solutions in the illustrative examples. In one illustrative example, a technical solution is present in which formats for a portion of the information are controlled by a limited number of sources 112.

In one illustrative example, each portion of the information is controlled by a source. By limiting the number of sources that control a portion of the information, the format for information in a particular portion of the information may be consistent throughout the information in that portion. As a result, access to the information may be simplified. For example, consumers of information may need to perform less reformatting of a portion of the information when the formatting is controlled by a single source.

Further, in an illustrative example, the information manager provides one or more technical solutions to the technical problem of information being usable at different times, changing over time, or both being usable at different times and changing over time in an information system. In one illustrative example, the technical solution uses temporal data to identify information to be returned to client computer system 1344. In this manner, the usability, and when changes are made to information 1304, may be taken into account in processing requests for information made by client computer systems 1320. Additionally, the temporal data may be returned with information that is responsive to requests. As a result, the temporal data may make identifying and then performing operations more accurate.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing information, the method comprising:
   receiving, by a computer system, the information from sources for distribution to client computer systems;
   identifying, by the computer system, a piece of the information received from the sources, wherein the piece of the information when transmitted and received is not associated with and does not include temporal data;
   placing, by the computer system, the information into a graph database at a location that is between the client computer systems and the sources, wherein placing the information comprises storing the information within a set of nodes indicating formats for the information and values for the information, wherein the piece of the information is stored as an aggregate object, wherein the aggregate object comprises different versions of the piece of information;
   identifying, by the computer system, the temporal data for the piece of the information based on a policy; and
   associating, by the computer system, the temporal data with the piece of the information, enabling analyzing the information by a client computer system with increased accuracy, wherein associating the temporal data with the piece of the information comprises storing a snapshot of the piece of the information as part of the aggregate object, wherein the snapshot is a version of the piece of the information associated with the temporal data.

2. The method of claim 1 further comprising:
   repeating, by the computer system, identifying the piece of the information received from the sources without the temporal data; identifying the temporal data for the piece of the information based on the policy; and associating the temporal data with the piece of the information for each piece of the information that is unassociated with the temporal data.

3. The method of claim 1, wherein the steps of identifying the piece of the information without the temporal data; identifying the temporal data for the piece of the information based on the policy; and associating the temporal data with the piece of the information are performed by an information manager in a location where the information is located.

4. The method of claim 1, wherein the temporal data is bi-temporal data that indicates a date of when the information changes and when the information is useable.

5. The method of claim 4, wherein the date of when the information changes and when the information is useable indicates a change date of when the information was changed.

6. The method of claim 1, wherein the temporal data indicates at least one of when the information is changed or when the information is useable.

7. The method of claim 1, wherein the temporal data indicates when the information is usable by indicating at least one of a first date of when the information becomes useable, a second date indicating when the information becomes unusable, a first range of dates during which the information is useable, or a second range of dates during which the information is unusable.

8. The method of claim 1 further comprising:
   receiving, by the computer system, the piece of the information without the temporal data from a source, wherein the temporal data associated with the information is unavailable from the source.

9. A computer system, comprising:
   a hardware processor; and
   an information manager, in communication with the hardware processor, that receives information from sources for distribution to client computer systems; identifies a piece of the information received from the sources, wherein the piece of the information when transmitted and received is not associated with and does not include temporal data; places the information into a graph database at a location that is between the client computer systems and the sources, wherein placing the information comprises storing the information within a set of nodes indicating formats for the information and values for the information, wherein the piece of the information is stored as an aggregate object, wherein the aggregate object comprises different versions of the piece of information; identifies the temporal data for the piece of the information based on a policy; and associates the temporal data with the piece of the information, enabling analyzing the information by a client computer system with increased accuracy, wherein associating the temporal data with the piece of the information comprises storing a snapshot of the piece of the information as part of the aggregate object, wherein the snapshot is a version of the piece of the information associated with the temporal data.

10. The computer system of claim 9, wherein the information manager repeats
    repeating the identifying the piece of the information received from the sources without the temporal data; identifying the temporal data for the piece of the information based on the policy; and associating the temporal data with the piece of the information for each piece of the information that is unassociated with the temporal data.

11. The computer system of claim 9, wherein the temporal data is bi-temporal data that indicates a date of when the information changes and when the information is useable.

12. The computer system of claim 11, wherein the date of when the information changes indicates a change date of when the information was changed.

13. The computer system of claim 9, wherein the temporal data indicates at least one of when the information is changed or when the information is useable.

14. The computer system of claim 9, wherein the temporal data indicates when the information is usable by indicating at least one of a first date of when the information becomes useable, a second date indicating when the information becomes unusable, a first range of dates during which the information is useable, or a second range of dates during which the information is unusable.

15. The computer system of claim 9, wherein the information manager receives the piece of the information without the temporal data from a source, wherein the temporal data associated with the information is unavailable from the source.

16. A computer program product for accessing information, the computer program product comprising:
a non-transitory computer readable storage media;
first program code, stored on the computer readable storage media, for receiving the information from sources for distribution to client computer systems;
second program code, stored on the computer readable storage media, for identifying a piece of the information received from the sources, wherein the piece of the information when transmitted and received is not associated with and does not include temporal data;
third program code, stored on the computer readable storage media, for placing the information into a graph database at a location that is between the client computer systems and the sources, wherein placing the information comprises storing the information within a set of nodes indicating formats for the information and values for the information, wherein the piece of information is stored as an aggregate object, wherein the aggregate object comprises different versions of the piece of information;
fourth program code, stored on the computer readable storage media, for identifying the temporal data for the piece of the information based on a policy; and
fifth program code, stored on the computer readable storage media, for associating the temporal data with the piece of the information, enabling analyzing the information by a client computer system with increased accuracy, wherein associating the temporal data with the piece of the information comprises storing a snapshot of the piece of the information as part of the aggregate object, wherein the snapshot is a version of the piece of the information associated with the temporal data.

17. The computer program product of claim 16 further comprising:
program code, stored on the computer readable storage media, for repeating running of the second program code, the third program code, and the fourth program code for each piece of the information that is unassociated with the temporal data.

18. The computer program product of claim 16, wherein the first program code, the second program code, the third program code, and the fourth program code are run by an information manager in a location where the information is located.

19. The computer program product of claim 16, wherein the temporal data indicates at least one of when the information is changed or when the information is useable.

20. The computer program product of claim 16, wherein the temporal data indicates when the information is usable by indicating at least one of a first date of when the information becomes useable, a second date indicating when the information becomes unusable, a first range of dates during which the information is useable, or a second range of dates during which the information is unusable.

21. The computer program product of claim 16 further comprising:
program code, stored on the computer readable storage media, for receiving the piece of the information without the temporal data from a source, wherein the temporal data associated with the information is unavailable from the source.

22. A method for accessing information, the method comprising:
receiving, by a computer system, the information from sources for distribution to client computer systems;
identifying, by the computer system, a piece of the information received from the sources, wherein the piece of the information when transmitted and received is not associated with and does not include temporal data;
receiving, by a computer system, a request for the information, wherein the information is stored within a set of nodes of a graph database at a location that is between client computer systems and sources of the information, wherein the set of nodes indicates formats for the information and values for the information, wherein temporal data is associated with the information and indicates when the information is useable;
identifying, by the computer system, a time period for the request using the temporal data;
identifying, by the computer system, a piece of the information corresponding to the request and corresponding to the time period identified, wherein the piece of the information is stored as an aggregate object in the set of nodes, wherein the aggregate object comprises different versions of the piece of information, the aggregate object comprising a snapshot of the piece of the information, wherein the snapshot is a version of the piece of the information associated with the temporal data; and
returning, by the computer system, a response to the request, wherein the response includes the piece of the information, enabling performing an operation using the information with increased accuracy.

23. The method of claim 22, wherein the response includes the temporal data associated with the piece of the information.

24. The method of claim 22 further comprising:
identifying, by the computer system, the piece of the information without the temporal data;
identifying, by the computer system, the temporal data for the piece of the information based on a policy; and
associating, by the computer system, the temporal data with the piece of the information.

25. The method of claim 24, wherein the steps of identifying the piece of the information without the temporal data; identifying the temporal data for the piece of the information based on the policy; and associating the temporal data with the piece of the information are performed by an information manager in a location where the information is located.

26. The method of claim 24 further comprising:
receiving, by the computer system, the piece of the information without the temporal data from a source, wherein the temporal data associated with the information is unavailable from the source.

27. The method of claim 26 further comprising:
storing, by the computer system, the piece of the information and the temporal data for a portion of the information identified based on the policy as nodes in a graph database.

28. The method of claim 22, wherein the temporal data is bi-temporal data that indicates when the information changes and when the information is useable.

29. The method of claim 22, wherein the temporal data indicates at least one of a date of when the information changes or when the information is useable.

30. The method of claim 29, wherein the date of when the information changes indicates a change date of when the information was changed.

31. The method of claim 22, wherein the temporal data indicates when the information is usable by indicating at least one of a first date of when the information becomes useable, a second date indicating when the information becomes unusable, a first range of dates during which the information is useable, or a second range of dates during which the information is unusable.

32. The method of claim 22, wherein identifying the time period for the request using the temporal data comprises:
identifying, by the computer system, a group of time periods in which versions of the piece of the information are useable; and
identifying, by the computer system, the time period from the group of the time periods based on a policy for selecting the time periods for requests.

33. The method of claim 32, wherein the policy for selecting the time periods for the requests uses at least one of a time stamp for when the request was created or received, text in the request that identifies a date relative to a current date, a transaction identifier corresponding to the request, or configuration information for at least one of a client computer system that sent the request or a source of the versions of the piece of the information, and wherein the text in the request identifying the date relative to the current date is selected from at least one of latest useable effective date range, effective as of next week, effective as of next month, effective as of next quarter, or effective as of next calendar year.

34. A computer system, comprising:
a hardware processor; and
an information manager, in communication with the hardware processor, that receives information from sources for distribution to client computer systems; identifies a piece of the information received from the sources, wherein the piece of the information when transmitted and received is not associated with and does not include temporal data; receives a request for information, wherein the information is stored within a set of nodes of a graph database at a location that is between client computer systems and sources of the information, wherein the set of nodes indicates formats for the information and values for the information, wherein temporal data is associated with the information and indicates when the information is useable; identifies a time period for the request using the temporal data; identifies a piece of the information corresponding to the request and corresponding to the time period identified, wherein the piece of the information is stored as an aggregate object in the set of nodes, wherein the aggregate object comprises different versions of the piece of information, the aggregate object comprising a snapshot of the piece of the information, wherein the snapshot is a version of the piece of the information associated with the temporal data; and returns a response to the request, wherein the response includes the piece of the information, enabling performing an operation using the information with increased accuracy.

35. The computer system of claim 34, wherein the response includes the temporal data associated with the piece of the information.

36. The computer system of claim 34, wherein the information manager identifies the piece of the information without the temporal data; identifies the temporal data for the piece of the information based on a policy; and associates the temporal data with the piece of the information.

37. The computer system of claim 36, wherein the information manager receives the piece of the information without the temporal data from a source, wherein the temporal data associated with the information is unavailable from the source.

38. The computer system of claim 37, wherein the information manager stores the piece of the information and the temporal data for a portion of the information identified based on the policy as nodes in a graph database.

39. The computer system of claim 34, wherein the temporal data is bi-temporal data that indicates when the information changes and when the information is useable.

40. The computer system of claim 34, wherein the temporal data indicates at least one of when the information is changed or when the information is useable.

41. The computer system of claim 40, wherein a date of when the information changes indicates a change date of when the information was changed.

42. The computer system of claim 34, wherein the temporal data indicates when the information is usable by indicating at least one of a first date of when the information becomes useable, a second date indicating when the information becomes unusable, a first range of dates during which the information is useable, or a second range of dates during which the information is unusable.

43. The computer system of claim 34, wherein in identifying the time period for the request using the temporal data, the information manager identifies a group of time periods in which versions of the piece of the information are useable; and identifies the time period from the group of the time periods based on a policy for selecting the time periods for requests.

44. The computer system of claim 43, wherein the policy for selecting the time periods for the requests uses at least one of a time stamp for when the request was created or received, text in the request that identifies a date relative to a current date, a transaction identifier corresponding to the request, or configuration information for at least one of a client computer system that sent the request or a source of the versions of the piece of the information, and wherein the text in the request identifying the date relative to the current date is selected from at least one of latest useable effective date range, effective as of next week, effective as of next month, effective as of next quarter, or effective as of next calendar year.

45. A computer program product for accessing information, the computer program product comprising:
- a non-transitory computer readable storage media;
- zeroth program code, stored on the computer readable storage media, for receiving the information from sources for distribution to client computer systems and for identifying a piece of the information received from the sources, wherein the piece of the information when transmitted and received is not associated with and does not include temporal data;
- first program code, stored on the computer readable storage media, for receiving a request for the information, wherein the information is stored within a set of nodes of a graph database at a location that is between client computer systems and sources of the information, wherein the set of nodes indicates formats for the information and values for the information, wherein temporal data is associated with the information and indicates when the information is useable;
- second program code, stored on the computer readable storage media, for identifying a time period for the request using the temporal data;
- third program code, stored on the computer readable storage media, for identifying a piece of the information corresponding to the request and corresponding to the time period identified, wherein the piece of the information is stored as an aggregate object in the set of nodes, wherein the aggregate object comprises different versions of the piece of information, the aggregate object comprising a snapshot of the piece of the information, wherein the snapshot is a version of the piece of the information associated with the temporal data; and
- fourth program code, stored on the computer readable storage media, for returning a response to the request, wherein the response includes the piece of the information, enabling performing an operation using the information with increased accuracy.

46. The computer program product of claim 45, wherein the response includes the temporal data associated with the piece of the information.

47. The computer program product of claim 45 further comprising:
- fifth program code, stored on the computer readable storage media, for identifying the piece of the information without the temporal data;
- sixth program code, stored on the computer readable storage media, for identifying the temporal data for the piece of the information based on a policy; and
- seventh program code, stored on the computer readable storage media, for associating the temporal data with the piece of the information.

48. The computer program product for of claim 47 further comprising:
- eighth program code, stored on the computer readable storage media, for receiving the piece of the information without the temporal data from a source, wherein the temporal data associated with the information is unavailable from the source.

49. The computer program product of claim 48 further comprising:
- ninth program code, stored on the computer readable storage media, for storing the piece of the information and the temporal data for a portion of the information identified based on the policy as nodes in a graph database.

50. The computer program product for of claim 45, wherein the temporal data is bi-temporal data that indicates when the information changes and when the information is useable.

51. The computer program product of claim 45, wherein identifying the time period for the request using the temporal data comprises:
- fifth program code, stored on the computer readable storage media, for identifying a group of time periods in which versions of the piece of the information are useable; and
- sixth program code, stored on the computer readable storage media, for identifying the time period from the group of the time periods based on a policy for selecting the time periods for requests.

* * * * *